US012529937B2

(12) United States Patent
Liu et al.

(10) Patent No.: US 12,529,937 B2
(45) Date of Patent: Jan. 20, 2026

(54) DETECTING OFF-RESONANCE SIGNALS IN A VAPOR CELL SENSOR

(71) Applicant: WaveRyde Instruments Inc., Waterloo (CA)

(72) Inventors: Chang Liu, Waterloo (CA); Stephanie M. Bohaichuk, Waterloo (CA); Reza Majidi-Ahy, Waterloo (CA); James P. Shaffer, Waterloo (CA)

(73) Assignee: WaveRyde Instruments Inc., Waterloo (CA)

( * ) Notice: Subject to any disclaimer, the term of this patent is extended or adjusted under 35 U.S.C. 154(b) by 0 days.

(21) Appl. No.: 18/919,850

(22) Filed: Oct. 18, 2024

(65) Prior Publication Data

US 2025/0362360 A1 Nov. 27, 2025

Related U.S. Application Data

(60) Provisional application No. 63/650,598, filed on May 22, 2024.

(51) Int. Cl.
*G01R 33/26* (2006.01)
*G01R 29/08* (2006.01)

(52) U.S. Cl.
CPC ......... *G01R 33/26* (2013.01); *G01R 29/0885* (2013.01); *G01R 29/0892* (2013.01)

(58) Field of Classification Search
CPC . G01R 33/26; G01R 29/0885; G01R 29/0892
(Continued)

(56) References Cited

U.S. PATENT DOCUMENTS

| 4,918,491 A | 4/1990 | Sonobe |
| 6,493,091 B2 | 12/2002 | Kourogi et al. |

(Continued)

FOREIGN PATENT DOCUMENTS

| AU | 2013290020 A1 * | 2/2015 | ............ G01N 27/72 |
| CA | 3120473 | 7/2020 | |

(Continued)

OTHER PUBLICATIONS

Shaffer, J P, et al., "A read-out enhancement for microwave electric field sensing with Rydberg atoms", Proc. SPIE vol. 10674, Quantum Technologies, 2018, 12 pgs.

(Continued)

*Primary Examiner* — Christopher P McAndrew
(74) *Attorney, Agent, or Firm* — Henry Patent Law Firm PLLC

(57) ABSTRACT

In a general aspect, a quantum spectrum sensing system is presented. In some implementations, a system includes a laser system, a vapor cell sensor, an optical detector, and a signal processing system. The laser system includes a first laser that generates a first laser signal; a comb generator that produces a frequency comb signal based on the first laser signal; and a second laser generates a second laser signal. The vapor cell sensor includes a vapor and receives input optical signals based on the frequency comb signal and the second laser signal. The vapor cell sensor produces output optical signals based on interactions of the vapor with the input optical signals and electromagnetic radiation. The signal processing system processes the output optical signals to identifying signals in the electromagnetic radiation that are off resonance with a transition frequency between Rydberg states of the vapor.

30 Claims, 11 Drawing Sheets

(58) Field of Classification Search
USPC .......................................................... 324/304
See application file for complete search history.

(56) References Cited

U.S. PATENT DOCUMENTS

| | | | |
|---|---|---|---|
| 7,323,941 B1* | 1/2008 | Happer | G01R 33/26 |
| | | | 331/3 |
| 10,038,301 B1 | 7/2018 | Eggleston et al. | |
| 10,509,065 B1 | 12/2019 | Shaffer | |
| 10,564,201 B1* | 2/2020 | Shaffer | G01R 29/10 |
| 10,605,840 B1 | 3/2020 | Amarloo et al. | |
| 10,802,066 B1 | 10/2020 | Keaveney et al. | |
| 10,859,981 B1 | 12/2020 | Ramirez-Serrano et al. | |
| 11,137,487 B1 | 10/2021 | Amarloo et al. | |
| 11,209,473 B2 | 12/2021 | Amarloo et al. | |
| 11,300,599 B1 | 4/2022 | Amarloo et al. | |
| 11,307,233 B1 | 4/2022 | Amarloo et al. | |
| 11,313,926 B1 | 4/2022 | Amarloo et al. | |
| 11,346,877 B2 | 5/2022 | Imhof et al. | |
| 11,366,430 B2 | 6/2022 | Ramirez-Serrano et al. | |
| 11,391,797 B1 | 7/2022 | Amarloo et al. | |
| 11,429,010 B1 | 8/2022 | Nelson et al. | |
| 11,435,234 B1 | 9/2022 | Keaveney et al. | |
| 11,658,461 B1* | 5/2023 | Liu | H01S 5/141 |
| | | | 372/18 |
| 11,681,016 B1 | 6/2023 | Bohaichuk et al. | |
| 11,874,311 B1* | 1/2024 | Dixon | G01R 29/0885 |
| 11,899,057 B2 | 2/2024 | Xu | |
| 12,028,084 B2* | 7/2024 | Salim | H04B 10/70 |
| 12,372,849 B1 | 7/2025 | Liu et al. | |
| 2013/0050795 A1 | 2/2013 | Qiu et al. | |
| 2015/0372447 A1 | 12/2015 | Song et al. | |
| 2016/0363617 A1 | 12/2016 | Anderson et al. | |
| 2018/0188305 A1* | 7/2018 | Hisatake | G01R 29/0814 |
| 2019/0181611 A1 | 6/2019 | Maleki et al. | |
| 2019/0293702 A1* | 9/2019 | Midori | G01R 29/0892 |
| 2020/0011913 A1* | 1/2020 | Hisatake | G01R 29/0885 |
| 2021/0080324 A1 | 3/2021 | Rieker et al. | |
| 2021/0373061 A1* | 12/2021 | Hisatake | G01R 29/10 |
| 2022/0196716 A1 | 6/2022 | Anderson et al. | |
| 2022/0228972 A1* | 7/2022 | Nelson | H01S 3/094096 |
| 2023/0137266 A1 | 5/2023 | Mcbride et al. | |
| 2024/0036094 A1 | 2/2024 | Dixon et al. | |
| 2025/0085325 A1 | 3/2025 | Bohaichuk | |

FOREIGN PATENT DOCUMENTS

| | | | | |
|---|---|---|---|---|
| IN | 452021 | 11/2021 | | |
| WO | WO-2006084313 A1 * | 8/2006 | ........... | G01R 33/441 |
| WO | 2023184013 | 10/2023 | | |
| WO | 2024020667 | 2/2024 | | |

OTHER PUBLICATIONS

Simons, et al., "A Rydberg atom-based mixer: Measuring the phase of a radio frequency wave", Appl. Phys. Lett. 114, Mar. 18, 2019, 5 pgs.
Spencer, et al., "An optical-frequency synthesizer using integrated photonics", Nature 557, 81, May 3, 2018, 8 pgs.
Talvard, et al., "Enhancement of the performance of a fiber-based frequency comb by referencing to an acetylene-stabilized fiber laser", Optics Express, 25, 3, Feb. 6, 2017, 11 pgs.
Urabe, et al., "Absorption spectroscopy using interference between optical frequency comb and single-wavelength laser", App. Phys. Lett. 101, Jul. 31, 2012, 5 pgs.
Wu, et al., "Generation of very flat optical frequency combs from continuous-wave lasers using cascaded intensity and phase modulators driven by tailored radio frequency waveforms", Optics Letters, 35, 19, Sep. 23, 2010, 3 pgs.
Xue, et al., "Microresonator Kerr frequency combs with high conversion efficiency", Laser Photonics Rev. 11, Jan. 9, 2017, 7 pgs.
Zhang, et al., "Rydberg microwave frequency comb spectrometer", arXiv:2206.06572v1, Jun. 14, 2022, 10 pgs.

USPTO, Notice of Allowance mailed Mar. 31, 2023, in U.S. Appl. No. 18/150,110, 16 pgs.
USPTO, Non-Final Office Action issued in U.S. Appl. No. 18/296,307 on Jun. 20, 2023, 28 pages.
USPTO, Notice of Allowance issued in U.S. Appl. No. 18/296,307 on Oct. 17, 2023, 8 pages.
WIPO, International Search Report and Written Opinion issued in Application No. PCT/CA2023/050914 on Sep. 19, 2023, 8 pages.
"Ultra-Narrow Bandwidth Filters FBG, DFB & Photosensitive Fibers", https://photonics.ixblue.com/store/fiber-bragg-gratings/ultra-narrow-bandwidth-filters#products, accessed on Apr. 7, 2024., 6 pages.
Anderson, et al., "Continuous-frequency measurements of high-intensity microwave electric fields with atomic vapor cells", Appl. Phys. Lett. 111, Aug. 2, 2017, 6 pgs.
Anderson, et al., "Optical Measurements of Strong Microwave Fields with Rydberg Atoms in a Vapor Cell", Phys. Rev. App. 5, Mar. 4, 2016, 8 pgs.
Black, "An introducton to Pound-Drever-Hall laser frequency stabilization", American Journal of Physics 69, 79, Apr. 2000, 10 pgs.
Bohaichuk, Stephanie M, et al., "A Three-Photon Rydberg Atom-Based Radio Frequency Sensing Scheme with Narrow Linewidth", arXiv:2304.07409 [physics.atom-ph], 2023, 11 pages.
Bohaichuk, Stephanie M, et al., "The Origins of Rydberg Atom Electrometer Transient Response and its Impact on Radio Frequency Pulse Sensing", arXiv:2203.01733, Mar. 3, 2022, 21 pgs.
Deschenes, et al., "Frequency-noise removal and on-line calibration for accurate frequency comb interference spectroscopy of acetylene", Applied Optics, vol. 53, No. 4, Feb. 1, 2014, 5 pgs.
Dixon, Katelyn, et al., "Rydberg atom-based Electrometry Using a Self-Heterodyne Frequency Comb Readout and Preparation Scheme", arXiv:2209.02583 [physics.atom-ph], Sep. 6, 2022, 18 pages.
Dixon, Katelyn, "Rydberg atom-based Electrometry Using a Self-Heterodyne Frequency Comb Readout and Preparation Scheme", Physical Review Applied 19, 034078, 2023, 8 Pages.
Dong, Po, et al., "GHz-bandwidth optical filters based on high-order silicon ring resonators", vol. 18, No. 23, pp. 23784-23789, Optics Express, Oct. 27, 2010, 7 pages.
Dutta, et al., "Mode-hop-free tuning over 135 GHz of external cavity diode lasers without anti-reflection coating", Applied Physics B, 106, 2012, 6 pgs.
Fan, Haoquan, et al., "Atom based RF electric field sensing", Journal of Physics B: Atomic, Molecular and Optical Physics 48 202001 (2015), Sep. 9, 2015, 17 pgs.
Fan, H Q, et al., "Dispersive radio frequency electrometry using Rydberg atoms in a prism-shaped atomic vapor cell", J.Phys. B: At. Mol. Opt. Phys. 49 104004, 2016, 8 pgs.
Fortier, et al., "20 years of developments in optical frequency comb technology and applications", Communications Physics, Dec. 6, 2019, 16 pgs.
Gagliardi, et al., "Sub-Doppler spectroscopy of H2 18O at 1.4um", App. Phys. B 70, Mar. 24, 2020, 6 pgs.
Geng, et al., "Photonic integrated circuit implementation of a sub-GHz-selectivity frequency comb filter for optical clock multiplication", Optics Express 25, Oct. 30, 2017, 11 pgs.
Gordon, Joshua A, et al., "Millimeter Wave Detection via Autler-Townes Splitting in Rubidium Rydberg Atoms", Applied Physics Letters, 105(2):024104, Jun. 2014, 5 pages.
Hasan, et al., "Integrated optical SSB modulation / frequency shifting using cascaded silicon MZM", IEEE Photonics Technology Letters, 2020, 5 pgs.
Hebert, et al., "Real-Time Dynamic Atomic Spectroscopy Using Electro-Optic Frequency Combs", Oct. 25, 2016, 9 pgs.
Hebert, et al., "Self-heterodyne interference spectroscopy using a comb generated by pseudo-random modulation", Optics Express, Oct. 14, 2015, 13 pgs.
Holloway, et al., "Broadband Rydberg Atom-Based Electric-Field Probe: From Self-Calibrated Measurements to Sub-Wavelength Imaging", arXiv:1405.7066v1, May 27, 2014, 12 pgs.
Holloway, et al., "Sub-Wavelength Imaging and Field Mapping via EIT and Autler-Townes Splitting in Rydberg Atoms", arXiv:1404.0289v1, Apr. 1, 2014, 12 pgs.

(56) References Cited

OTHER PUBLICATIONS

Holzwarth, et al., "Optical Clockworks and the Measurement of Laser Frequencies With a Mode-Locked Frequency Comb", IEEE J. of Quantum Electronics 37, Dec. 2001, 9 pgs.

Ji, et al., "Exploiting Ultralow Loss Multimode Waveguides for Broadband Frequency Combs", Laser & Photonics Reviews 15, 2000353, 2021, 14 pgs.

Jin, Warren, et al., "Piezoelectrically tuned silicon nitride ring resonator", vol. 26, No. 3, pp. 3174-3187 Optics Express, Jan. 30, 2018, 14 pages.

Jin, et al., "Piezoelectrically tuned silicon nitride ring resonator", Optics Express 26, Feb. 5, 2018, 14 pgs.

Jing, et al., "Atomic superheterodyne receiver based on microwave-dressed Rydberg spectroscopy", Nature Physics, vol. 16, Sep. 2020, 11 pgs.

Kim, Bok Young, et al., "Turn-key, high-efficiency Kerr comb source", arXiv:1907.07164 [physics.optics], Jul. 16, 2019, 5 pages.

Kumar, et al., "Atom-Based Sensing of Weak Radio Frequency Electric Fields Using Homodyne Readout", Scientific Reports 7:42981, Feb. 20, 2017, 10 pgs.

Kumar, et al., "Rydberg-atom based radio-frequency electrometry using frequency modulation spectroscopy in room temperature vapor cells", Optics Express, vol. 25, No. 8, Apr. 17, 2017, 13 pgs.

Liu, Chang, et al., "Stable, narrow-linewidth laser system with a broad frequency tunability and a fast switching time", Optics Letters 49, 399, Jan. 8, 2024, 6 pages.

Long, et al., "Multiplexed sub-Doppler spectroscopy with an optical frequency comb", Phys.Rev.A, Dec. 2016, 10 pgs.

Marangos, et al., "Electromagnetically induced transparency", J. Modern Optics 45, 3, 1998, 33 pgs.

Metcalf, et al., "Stand-Alone High-Power Broadly Tunable Optoelectronic Frequency Comb Generator", OFC/NFOEC Technical Digest, JW2A. Mar. 15, 2013.

Noaman, Mohammad, et al., "Rydberg-Atom Sensors in Bichromatic Radio-Frequency Fields", Phys. Rev. Applied 20, 024068., Aug. 28, 2023, 6 pages.

Noaman, M, et al., "Vapor Cell Characterization and Optimization for Applications in Rydberg Atom-Based Radio Frequency Sensing", Proceedings vol. 12447, Quantum Sensing, Imaging, and Precision Metrology; 124470V, Mar. 8, 2023, 6 pages.

Okoshi, T., et al., "Novel Method for High Resolution Measurement of Laser Output Spectrum", Electronics Letters, vol. 16 No. 16, Jul. 31, 1980, 2 pages.

Ozharar, et al., "Ultraflat Optical Comb Generation by Phase-Only Modulation of Continuous-Wave Light", IEEE Photonics Technology Letters, Jan. 1, 2008, 3 pgs.

Parriaux, et al., "Electro-optic frequency combs", Advances in Optics and Photonics, vol. 12, No. 1, Mar. 16, 2020, 65 pgs.

Picque, "Frequency comb spectroscopy", Nature Photonics, vol. 13, Mar. 2019, 12 pgs.

Rozwadowski, et al., "Measurement of the Density of Saturated Cesium Vapor by an Optical Method", The Journal of Chemical Physics, May 18, 2004, 5 pgs.

Saliba, et al., "Mode stability of external cavity diode lasers", Applied Optics, 48, 35, Dec. 1, 2009. 11 pgs.

Schmidt, Matthias, et al., "Rydberg atom-based radio frequency sensors: amplitude regime sensing", arXiv:2307.00121v1 [physics.atom-ph], retrieved on Jun. 30, 2023, 33 pages.

Schwettmann, et al., "Field-programmable gate array based locking circuit for external cavity diode laser frequency stabilization", Rev. Sci. Instrum. 82, Oct. 7, 2011, 7 pgs.

Sedlacek, et al., "Atom-Based Vector Microwave Electrometry Using Ribidium Rydberg Atoms in a Vapor Cell", Physical Review Letters, Aug. 6, 2013, 5 pgs.

Sedlacek, et al., "Microwave electrometry with Rydberg atoms in a vapour cell using bright atomic resonances", Nature Physics 8, Nov. 2012, 6 pgs.

USPTO, Notice of Allowance issued in U.S. Appl. No. 18/919,819 on Apr., 4, 2025; 25 pages.

ISA, International Search Report and Written Opinion issued in Application No. PCT/CA2025/050721 on Jul. 24, 2025, 13 pages.

ISA, International Search Report and Written Opinion issued in Application No. PCT/CA2025/050763 on Aug. 5, 2025, 10 pages.

Sugiyama, et al., "Precision dual-comb spectroscopy using wavelength-converted frequency combs with low repetition rates", Scientific Reports, vol. 13, Feb. 13, 2023, 10 pages,.

\* cited by examiner

DETECTING OFF-RESONANCE SIGNALS IN A VAPOR CELL SENSOR

CROSS-REFERENCE TO RELATED APPLICATIONS

This application claims priority to U.S. Provisional Patent Application No. 63/650,598, filed May 22, 2024, entitled "Quantum Spectrum Sensing Systems." The above-referenced priority document is incorporated herein by reference.

TECHNICAL FIELD

The following description relates to detecting off-resonance signals in a vapor cell sensor.

BACKGROUND

Wireless communication systems, including 5G and 6G wireless communication systems operating in both microwave (FR1, <7.125 GHz) and millimeter-wave (FR2, >24.250 GHz) bands, use directional beamforming antenna arrays to generate wireless signals. These antenna arrays can be tested to detect problems and to monitor their performance. For example, over-the-air (OTA) testing can be used to characterize the performance of cellular base station antenna arrays.

DETAILED DESCRIPTION

Figure 1A:
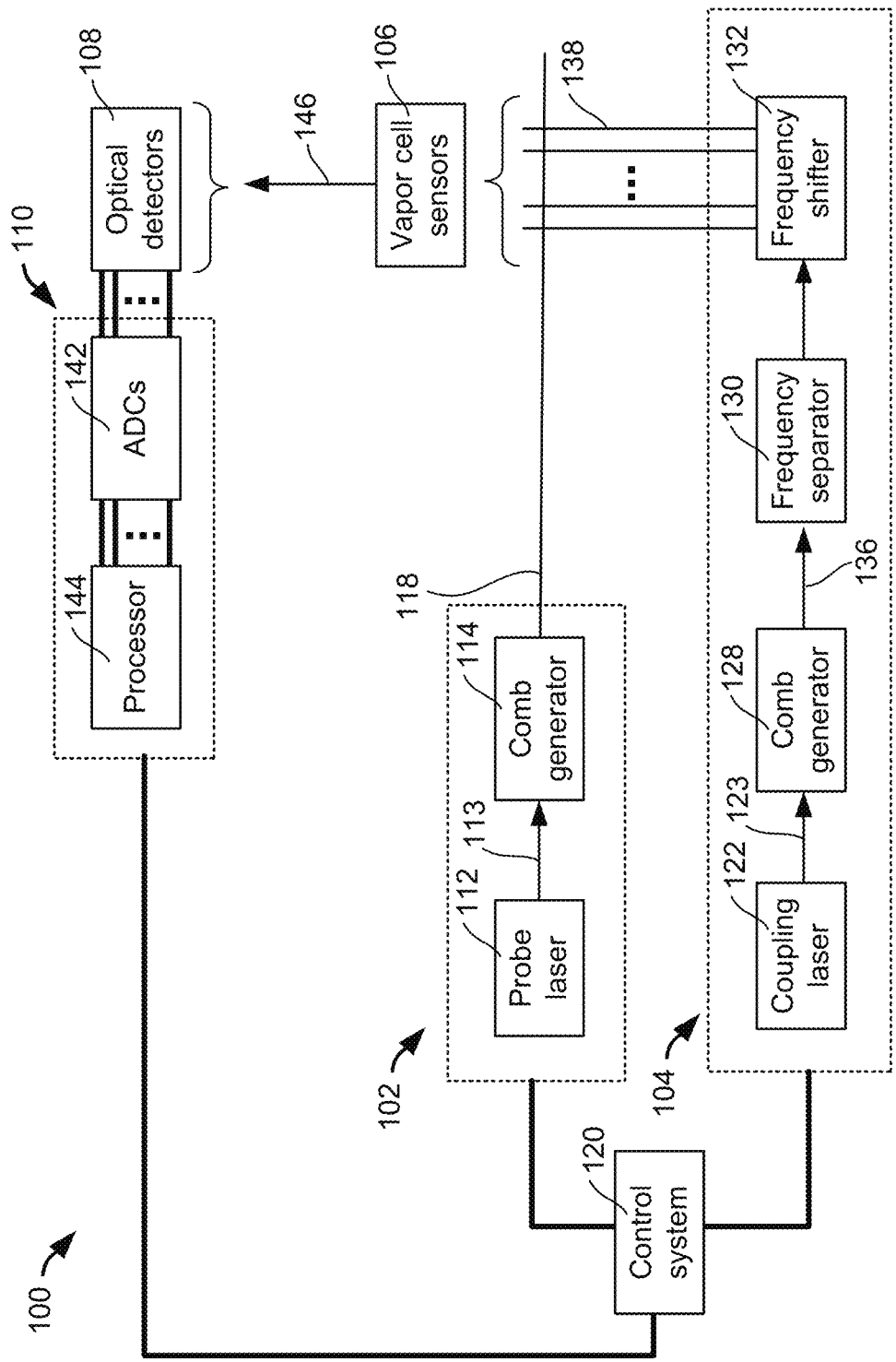
FIGS. 1A-1B are block diagrams showing aspects of example QSS systems.

In a general aspect, quantum spectrum sensing (QSS) systems can be used to detect electromagnetic radiation. In some implementations, QSS systems can be deployed in the field with improved field-spectrum sensing bandwidth, scan-speed, jamming-resistance, accuracy, repeatability, passivity, simplicity, cost, or a combination of these and potentially other improvements. QSS systems can be configured to measure a variety of useful parameters and characteristics. In some examples, QSS systems can measure nonlinear, linear, and electromagnetic field compliance (EMC)/electromagnetic interference (EMI) using over-the-air measurement.

In some example contexts, site surveys for 5G-6G base stations focus on FR1 (FR1, <7.125 GHz) and FR2 (FR2, >24.250 GHz) bands of the radio frequency (RF) spectrum; and electronic warfare (EW) focuses on detecting all signals present from UHF to W-band (0.1-100 GHz). Signals intelligence and 5G-6G site surveying can require sensing over a large frequency range spanning, for example, around 0.1-100 GHz, UHF to W-band. Spectrum sensing systems operated in the field need to function in all types of weather and those used for EW also need to be covert and passive. For 5G-6G it is beneficial to have a system that is passive and can be operated in the near field region. Important properties for these applications are fast scanning of full range of frequencies that are of interest, repeatability, agility to focus on regions of importance where signals of interest exist, portable SWaP-C(Size, Weight, Power, and Cost), passivity in sensing, and antenna agility. In some implementations, the QSS systems described here can be configured to provide some or all of these properties and potentially other technical advantages and improvements.

In some implementations, QSS systems include a laser system, a vapor cell sensor and an optical detector. The laser system may include a probe laser configured to generate a probe laser signal, a coupling laser configured to generate a coupling laser signal, a first comb generator configured to receive the probe laser signal from the probe laser and generate a first frequency comb signal, a second comb generator configured to receive the coupling laser signal and generate a second frequency comb signal, and one or more frequency shifters configured to shift one or more selected frequency components toward one or more Rydberg estates of the vapor. The vapor cell sensor can contain a vapor and can receive input optical signals that are based on the first frequency comb signal and the shifted one or more frequency components of the second frequency comb signal. The vapor cell sensor may generate an output optical signal based on the interaction of the vapor and the input optical signals. The optical detector can detect the output optical signals. QSS systems may include a control system, a signal processing system, and other components. In some instances, the laser system of the QSS system may include semiconductor lasers; and devices and components of the QSS system can include photonic integrated circuits, which can reduce the SWaP-C of the QSS system. In some instances, QSS systems may include RF optics such as a lens or parabolic dish to increase the sensitivity.

In some instances, the vapor cell sensor of a QSS system is a Rydberg atom-based vapor cell sensor. Rydberg atom-based vapor cell sensors can provide a number of advantages, in various contexts. For instance, Rydberg-atom-based vapor cell sensors are not typically damaged by large RF signals, such as jamming signals in electronic warfare and neighboring base stations or radar for 5G-6G use cases. Each vapor cell sensor of a QSS system can be omnidirectional and self-calibrated. A Rydberg-atom-based vapor cell sensor may have a wide carrier bandwidth, for example, capable of detecting an ultra-broadband spectrum such as 0.1-100-GHz without changing the vapor cell sensor. QSS systems can simplify measurements, for example, when they are passive, non-perturbative, and do not require equipment changes over a large bandwidth (e.g., a bandwidth greater than 100 GHz). In some instances, a QSS system may include multiple vapor cell sensors which can be used and flexibly arranged in a variety of configurations and topologies. For example, the multiple vapor cell sensors can be configured as a periodic array to detect a single frequency or several different frequencies, or to scan a single frequency range or multiple frequency ranges. For another example, the multiple vapor cell sensors can be reconfigured into a long baseline antenna to better detect angle of arrival. The multiple vapor cell sensors can receive different input optical signals (e.g., different frequency components of the second frequency comb signal) for detecting different RF frequencies of the electromagnetic radiation.

In some instances, QSS systems can support real-time spectrum analysis (RTSA) and fast-scanning spectrum sensing, for example, by leveraging an agile coupling laser system and a probe laser frequency comb heterodyne readout method. In some instances, a QSS system may enable fast changing of the RF sensing time (or Rydberg state), for example, 200 nanoseconds (ns) or lower. The first frequency comb signal may allow a readout of signals as broad as the Doppler background, e.g., about 1 GHz or another bandwidth. In some instances, the readout signals may include off-resonant electromagnetic transparency (EIT) or electromagnetically induced absorption (EIA) signals whose strength is related to the RF field strength (or Rabi frequency). In such cases, the QSS system may be capable of reading real time spectra with large bandwidths (e.g., around 1 GHz or another bandwidth). When the real-time spectra can be acquired in ~1-100 microseconds (μs), the entire carrier bandwidth of the 100 GHz may be acquired in less than 1 second (s) by stepping through Rydberg states whose RF sensing frequencies are separated by <1 GHz. Agile frequency scanning and dwelling at multiple carrier frequencies can be dynamically configured. For example, using the agile coupling laser system, a subset of the vapor cell sensors in the array can be configured to sense at 25 GHz, while another distinct subset of the vapor cell sensors in the array may be configured to dwell around 3 GHz—allowing a dynamically reconfiguration of the array of vapor cell sensors, for example, on the fly. The accuracy and repeatability of the measurements can also be increased using QSS systems, for example, since QSS systems can be inherently self-calibrated, enabling measurements at different times and locations to be compared quantitatively. Even in sensing regimes where strict self-calibration is not preserved, QSS systems can provide accurate and reproducible results since the measurements are done with atoms, whose structures are identical and preserved over time. In regimes where the accuracy is linked to knowing a laser power, this can be measured at accuracies that are better than calibration for conventional RF equipment.

In some implementations, QSS systems can provide a non-detectable spectrum sensing system. For example, the signal processing of the QSS system can be entirely digital and may be implemented without active electronics, such as a low-noise amplifier (LNA). In some instances, QSS systems can be field portable; and can be hardened and ruggedized for a variety of environmental conditions including temperature, humidity, shock, vibrations, as expected when carried by a 5G-6G-field technician or in a backpack by the soldiers. The use of individual components that can be hermetically sealed and fiber and/or electrically coupled to one another makes a highly robust device possible. In some cases, a combination of these and potentially other advantages and improvements may be obtained.

FIG. 1A is a block diagram showing aspects of an example QSS system 100. As shown in FIG. 1A, the example QSS system 100 includes a probe laser system 102, a coupling laser system 104, one or more vapor cell sensors 106, one or more optical detectors 108, a signal processing system 110, and a control system 120. The example QSS system 100 may include additional or different features, and the components of the example QSS system 100 may operate as described with respect to FIG. 1A or in another manner. For another example, the example QSS system 100 may include a user interface to communicate with other components or devices, to allow a user to modify values of control parameters of the control system 120, values of processing parameters of the signal processing system 110, or values of other parameters. In some cases, a user interface may include a computer readable code that can be run on the control system 120 and changed by the user to control the laser systems 102, 104 and the signal processing system 110. The code is capable of controlling switches, modulators, and mode of operation, for example, enabling the reconfiguration of devices and components. In some instances, reconfiguration may include updating the sensing regions, the dwell times, the scan speed, frequency range of interest, or other parameters. The user interface also runs diagnostics to monitor the health of the example QSS system 100. In some instances, the user interface may include a wired or wireless communication module to, for example wirelessly or optically, communicate with a remote computing system or other QSS systems at nearby geographic locations.

In some instances, the example QSS system 100 can be used for detecting radio frequency (RF) electromagnetic radiation. In some implementations, the example QSS system 100 uses an electro-optical comb for Rydberg atom-based electrometry with EIT-based or EIA-based transmission spectra. In some implementations, the example QSS system 100 can perform self-calibrated absolute power measurements by measuring the frequency splitting of a spectral line shape. The spectral line shape is based on the precise electronic transitions of a vapor, and as such, measurements based on its features (e.g., the frequency splitting) may be self-calibrated. In these implementations, the example QSS system 100 may experimentally measure the value of the frequency splitting, such as by operation of an optical detector. The example QSS system 100 may then use this measured value to determine the electric field strength of electromagnetic radiation interacting with the vapor. In certain instances, the example QSS system 100 may be used in other types of applications and measurements. In some instances, the example QSS system 100 may be operated according to the example process 400, 600 shown in FIGS. 4 and 6, or in another manner.

In some implementations, the probe laser system 102 of the example QSS system 100 includes a probe laser 112 and a first comb generator 114. In some instances, the probe laser system 102 is configured to generate a first frequency comb signal 118 to the one or more vapor cell sensors 106 based on a direct probe laser output signal 113. In some instances, the probe laser system 102 may be implemented as the probe laser system 200 shown in FIG. 2 or in another manner.

In some implementations, the probe laser 112 is a semiconductor laser. In some instances, the probe laser 112 may include other types of lasers, such as a fiber laser, a distributed feedback (DFB) laser, or a Bragg reflector (DBR) laser. For example, fiber lasers can be thermally or piezoelectrically tuned but need to be stabilized against a reference to eliminate laser frequency fluctuations. DFB and DBR lasers can be tuned electrically or thermally but may also need to be stabilized against a frequency reference. In some instances, the probe laser 112 may include a narrow spectral bandwidth laser. In certain examples, the probe laser 112 may need to re-acquire a lock signal for frequency stabilization once it approaches its new target frequency.

In the example shown in FIG. 1A, the first frequency comb signal 118 is an optical signal produced by the first comb generator 114; and has a comb-shaped frequency profile that is defined by comb lines at respective comb frequencies. In some implementations, the first comb generator 114 may be part of a photonic integrated circuit system; and may be made of thin film lithium niobate for electro-optic comb generation. In some instances, the first comb generator 114 may be based on a mode-locked laser, an optical micro-resonator, a nonlinear optical fiber, an acousto-optic modulator, or another type of optical comb generator.

As shown in FIG. 1A, the coupling laser system 104 includes a coupling laser 122, a second comb generator 128, a frequency separator 130, and a frequency shifter 132. The coupling laser system 104 is configured to generate a second frequency comb signal 136 and output one or more selected frequency components 138 of the second frequency comb signal 136 to the one or more vapor cell sensors 106. For example, one vapor cell sensor 106 may receive all the selected frequency components 138 from the coupling laser system 104 either in multiple sets of beam paths, or in a single beam path. In certain examples, each vapor cell sensor 106 may be configured to receive a respective subset of frequency components of the second frequency comb signal 136 from the coupling laser system 104.

In some instances, the coupling laser 122 of the example coupling laser system 104 may be a continuous wave (CW) laser; and the coupling laser signal 123 may be a frequency-locked output of the CW laser by operation of a laser stabilizer. In some cases, the coupling laser 122 may include a narrow-linewidth tunable laser. Narrow-linewidth tunable lasers can be constructed using external cavity diode laser (ECDL) technology, which allows for cheap and compact diode lasers capable of producing emissions in the violet to midinfrared spectral regime. With optical feedback from an external cavity, the narrow-linewidth tunable laser can also be achieved using a Fabry-Perot (FP) diode laser and/or gain chips. In this case, the ECDL may include a laser and a wavelength selection component (such as grating or interference filter). The FP diode laser's wavelength can be coarsely tuned over its wide gain bandwidth by rotating the angle between the laser beam and the grating/interference filter. Mode hops may occur when the tuning range exceeds a free spectral range of the external cavity, which in certain cases, can be around a few GHz, a few tens of GHz, exceeding 100 GHz, or in another range. In some instances, changes to the frequency can be made by adjusting temperature, or mechanically moving an element of the laser system (e.g., an optical element such as a mirror or lens).

Fluctuations in the temperature and injection current of the ECDL can cause the wavelength to drift. Meanwhile, acoustic noise and other unwanted perturbations of the laser cavity can broaden the spectral bandwidth to greater than 1 MHz, and possibly to 10 MHz. To compensate for these effects, an active feedback loop can be applied to lock the diode laser's frequency to a stable frequency reference, such as atomic or molecular transition, a FP cavity, or an optical frequency comb. The bandwidth of the feedback loop may be greater than 5 MHz, with about 1 MHz being possible for semiconductor lasers (e.g., ECDLs) due to their inherent noise characteristics.

In some instances, the coupling laser 122 is a semiconductor laser. In some instances, the coupling laser system 104 of the QSS system 100 in FIG. 1A can enable fast switching between different Rydberg states because the coupling laser 122 does not need to be tuned and relocked. In some instances, the coupling laser 122 may include other types of lasers, such as a fiber laser, a distributed feedback (DFB) laser, or a distributed Bragg reflector (DBR) laser. For example, when the coupling laser 122 includes a fiber laser, it can be thermally or piezoelectrically tuned; and needs to be stabilized against a reference to eliminate laser frequency fluctuations. When the coupling laser 122 includes a DFB or DBR laser, it can be tuned electrically or thermally; and needs to be stabilized against a reference. When the coupling laser 122 includes a narrow spectral bandwidth laser, it may need to re-acquire a lock signal for frequency stabilization once a new target frequency is approached.

Figure 3:
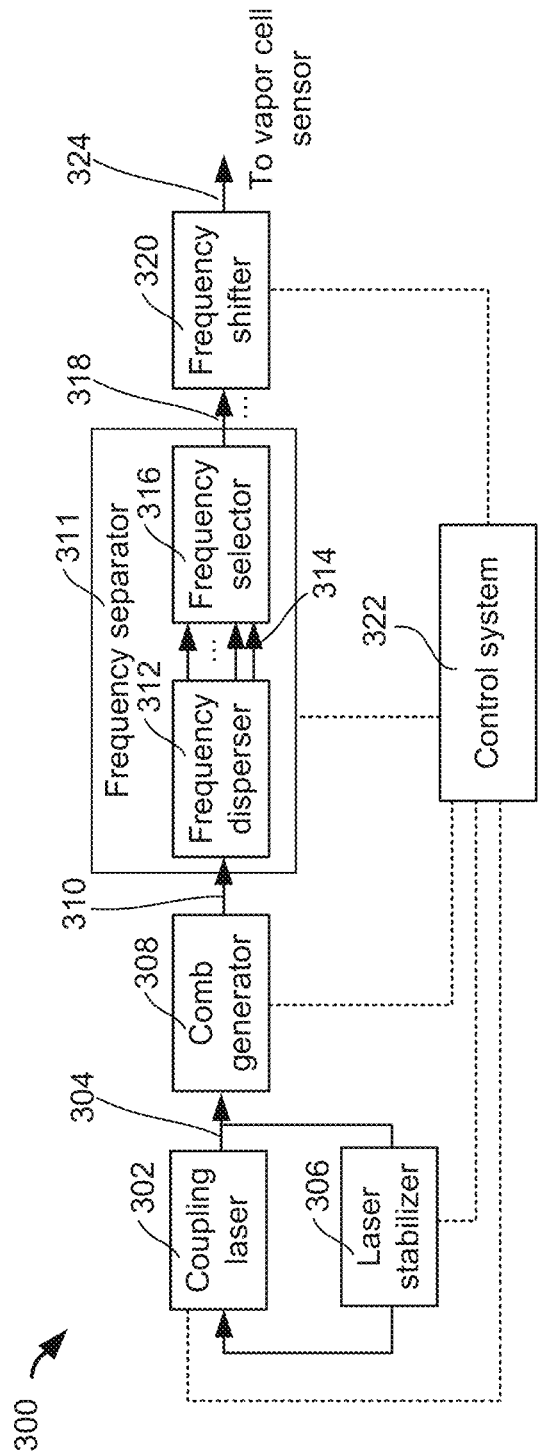
FIG. 3 is a block diagram showing aspects of an example coupling laser system.

In some implementations, the coupling laser system 104 includes other types of lasers having an output frequency that is locked to a frequency (absolute or approximately absolute) reference using a laser stabilizer (e.g., the laser stabilizer 306 of the example coupling laser system 300 in FIG. 3). In certain instances, the coupling laser 122 can operate analogously to an optical clock. In some examples, the frequency reference may be an interferometer (e.g., an FP cavity) or a molecular or atomic spectral feature that does not change over time. A cesium (Cs) clock is referenced to the frequency separating the two ground hyperfine states of a Cs atom (or ensemble thereof) and can be used to stabilize an optical frequency comb and the coupling laser by using the laser-optical frequency comb beat signal. Many optical clocks use narrow bandwidth atomic or ionic transitions for their reference transitions. With such a reference transition, the coupling laser 122 can generate a spectroscopic signal such as an atomic absorption that can be used to frequency lock the coupling laser 122. Fast electronics may then be used to generate an error signal from the atomic signal that is fed back to an actuator in the coupling laser 122 to correct its frequency.

In some implementations, the coupling laser 122 is configured to measure the derivative signal of an atomic spectral line. Taking the derivative of the signal (e.g., via frequency modulated spectroscopy) can produce an electrical signal with an approximately linear slope around the spectral line peak. If the direct coupling laser output signal 123 drifts away from its resonance, an electrical signal can be produced to correct the frequency of the direct coupling laser output signal 123. For example, the electrical signal may be a voltage signal whose sign indicates the direction of the laser frequency error. The fundamental frequency of the coupling laser signal 123 can be tuned relative to the reference by modulating the coupling laser signal 123—or alternatively, some fraction of its output after separating the fraction from the main laser output—to create a sideband at a desirable offset frequency and locking the sideband to the reference. The tuning can be precise since the sideband frequency is generated by a radio frequency source that can be locked to a clock, such as an ovenized (or thermally stabilized) crystal oscillator or even an atomic clock. Sub-hertz performance is possible. In many implementations of the coupling laser system 104, such offset tuning is used to align the optical frequency comb to dispersive elements (e.g., in the frequency separator 130), such as an arrayed waveguide grating. In some instances, the direct probe and coupling laser output signals 113, 123 generated by the probe and coupling lasers 112, 122 are both locked to a stable, narrow bandwidth reference such as a frequency comb, interferometer, atomic or molecular absorption line, or another type of reference.

In some examples, the coupling laser 122 may only have to lock to a single stable reference and the coupling laser 122 does not have to be relocked to its reference when the example coupling laser system 104 is switched between different outputs, which improves the robustness and repeatability of the system. In these configurations, the coupling laser system 104 may also extend the selection range of the wavelength. In some instances, the coupling laser 122 can have a spectral bandwidth less than 1 MHz, less than 1 kHz, less than 1 Hz, or another value.

As shown in FIG. 1A, the direct coupling laser output signal 123 produced as the output of the coupling laser 122 can be used to generate the second frequency comb signal 136 spanning the desired wavelength range by the second comb generator 128. In the example shown in FIG. 1A, the second frequency comb signal 136 has a comb-shaped frequency profile that is defined by comb lines at respective comb frequencies. In some implementations, the second comb generator 128 is part of a photonic integrated circuit system; and made of thin film lithium niobate for electro-optic comb generation. In some instances, the second comb generator 128 may be based on a mode-locked laser, an optical micro-resonator, a nonlinear optical fiber, an acousto-optic modulator, or another type of optical comb generator. The second comb generator 128 may be implemented as the first comb generator 114 or in another manner.

In some implementations, the example QSS system 100 allows frequency comb spectroscopy in which the probe and coupling lasers 112, 122 do not have to be tuned. Enough power can be allocated to each comb line in the first frequency comb signal 118 to measure virtually all practical de-tunings simultaneously. Moreover, large laser fluctuations of up to 10 MHz can be compensated by signal processing, and as such, in some instances, the probe and coupling lasers 112, 122 are not precisely locked. In some instances, only one of the probe and coupling lasers 112, 122 is locked to a reference frequency. The reference frequency may be different for the frequency of the probe and coupling lasers 112, 122.

In some instances, the frequency separator 130 includes one or more dispersive elements and one or more optical switches. For example, the one or more dispersive elements may be configured to separate different frequency components (e.g., comb lines) in the second frequency comb signal 136; and the one or more optical switches can be configured to receive the separated frequency components of the second frequency comb signal 136. In some instances, the frequency separator 130 of the coupling laser system 104 may include a network of drop-out filters as part of a photonic integrated circuit system tuned near each frequency component of the second frequency comb signal 136. In this case, the outputs of the drop-out filters may be combined, in whole or in part. The output of the coupling laser system 104 (e.g., one or more selected frequency components of the second frequency comb signal 136) can then be determined by which drop-out filters are tuned so that they are activated. Tuning of the drop-out filters can be accomplished with micro-heaters or by using piezoelectric elements. In some instances, the frequency separator 130 may be implemented as the frequency separator 311 shown in FIG. 3 or in another manner.

In some implementations, each frequency shifter 132 includes one or more fine-tuning elements for shifting the one or more selected frequency components 138 of the second frequency comb signal 136 before the one or more selected frequency components 138 are recombined or transmitted independently to one or more vapor cell sensors 106.

In some instances, frequencies of the selected frequency components of the second frequency comb signal 136 can be fine-tuned by operation of the frequency shifter 132. In some instances, each fine-tune element of the frequency shifter 132 may include an electro-optic modulator (EOM), to shift the frequency of a frequency component to a desired value. In some instances, an electro-optic modulator can be configured as an IQ modulator (e.g., in a Mach-Zehnder configuration), which can allow for modulation of a single sideband suppressed carrier (SSB-SC). In some instances, the frequency shifter 132 may be implemented as the frequency shifter 184, 320 in the example coupling laser system 154, 300 in FIGS. 1B and 3 or in another manner. In some instances, the comb spacing is less than the spectral range of the frequency shifter 132 to ensure continuous coverage. For example, the frequency components in the second frequency comb signal 136 may be separated from each other by a common frequency spacing, by operation of the frequency separator 130. In some instances, the frequency shifter 132 may be configured to shift the frequencies of the selected frequency components by a frequency magnitude no less than the common frequency spacing. In some instances, the probe laser system 102 may also include a frequency shifter with one or more fine-tuning elements configured to shift one or more frequencies of the frequency components in the first frequency comb signal 118.

In some instances, the switching speed of the coupling laser system 104 may also be affected by the frequency relock time of a radio frequency oscillator driving the one or more fine-tuning elements in the frequency shifter 132. Moreover, the spectral linewidth may be determined by the spectral bandwidth of the optical clock, which can be less than 1 Hz in certain cases. Many atomic physics applications require laser light with a spectral bandwidth of less than 1 MHz. In some instances, such as when the coupling laser system 104 switches, its spectral bandwidth may be limited by a product of time and bandwidth. For example, if the switching time is 1 μs then the coupling laser system 104 may dwell for 10 μs to achieve a spectral bandwidth of 100 kHz. However, such a dwell time can be faster than the unlocking and relocking of a conventional laser. In some instances, the coupling laser system 104 may include one or more optical amplifiers at its output to achieve the desired output power that is necessary for injection into the vapor cell sensors 106.

In some implementations, each vapor cell sensor 106 includes a Rydberg atom-based vapor cell sensor. In some instances, each vapor cell sensor 106 includes a vapor in an enclosed volume (e.g., in a vapor cell). The vapor is used as a medium to interact with electromagnetic radiation. The vapor cell sensor 106 may include Rydberg atoms in a vapor state (e.g., vaporized $^{87}$Rb or $^{133}$Cs) that alter an optical transmission in response to the electromagnetic radiation. The optical transmission may be influenced by optical transitions of the atoms in the vapor state. In some instances, the vapor cell sensor 106 may be implemented as a metrology vapor cell, a glass vapor cell, a microelectromechanical system (MEMS) vapor cell, or another type of engineered vapor cell based on metamaterial or photonic crystal principles.

In some implementations, the vapor of the vapor cell sensor 106 is hermetically sealed and packaged in an electromagnetically transparent dielectric material, such as polylactic acid (PLA) plastic materials and other dielectric materials. In some implementations, the vapor cell sensor 106 is formed at least in part (wholly or partially formed) of a dielectric material that is transparent to the electromagnetic radiation. The vapor cell sensor 106 may be of the type described, for example, in the publication "Microwave electrometry with Rydberg atoms in a vapor cell using bright atomic resonances," by J. A. Sedlacek, et al. (*Nature Physics* 8, 819-824, 2012), or in U.S. Pat. No. 10,859,981 entitled "Vapor Cells Having One or More Optical Windows Bonded to a Dielectric Body." Other types or configurations of the vapor cell sensor 106 may be used in some cases. The dielectric material may define a window for the vapor cell sensor 106, through which electromagnetic radiation is received. Examples of the dielectric material include silicon, silicate-based glasses, borosilicate glass, and quartz.

In some implementations, the direct probe laser output signal 113 from the probe laser 112 has a probe frequency matched to a first optical electronic transition from the ground state to an excited state of a vapor in the one or more vapor cell sensors 106; and the direct coupling laser output signal 123 from the coupling laser 122 has a coupling frequency matched to a second optical electronic transition from an excited state to a Rydberg state of the vapor in the one or more vapor cell sensors 106. The first optical electronic transition may share an energy level in common with the second optical electronic transition. For example, the vapor may include first, second, and third electron energy levels that are each progressively higher in energy. The first optical electronic transition may be defined by a first energy gap between the first and second electron energy levels; and the second optical electronic transition may be defined by a second energy gap between the second and third electron energy levels. However, other arrangements of electron energy levels may be possible (e.g., an arrangement in which one or more subsequent electron energy levels are lower than a starting electron energy level).

In some implementations, electromagnetic radiation (e.g., RF pulses or other forms of RF radiation) are received by the vapor cell sensors 106. The electromagnetic radiation may be generated by an antenna or another type of RF generating apparatus that is located remote from the example QSS system 100, 150. The electromagnetic radiation may be generated by any source of RF electromagnetic radiation (e.g., an unknown source, a remote source, etc.). If the electromagnetic radiation is received by the vapor cell sensors 106, the signal processing system 110 may determine properties of the electromagnetic radiation.

In some implementations, the atoms in the vapor state include an RF electronic transition that is configured to alter, in response to absorbing electromagnetic radiation, an absorption of light by one or both the first and second optical electronic transitions. The RF electronic transition may correspond to an electronic transition that is defined by a pair of electron energy levels, at least one of which is different from the first, second, and third electron energy levels. The RF electronic transition may have a third energy gap that is smaller in magnitude than the first and second energy gaps of, respectively, the first and second optical electronic transitions. In some instances, the QSS systems 100 may include one or more additional laser systems which are configured to generate laser signals in addition to the probe and coupling laser signals 113, 123, the additional laser signals may have respective frequencies that are matched to different optical electronic transitions of the vapor. In certain cases, the absorption of light by these optical electronic transitions may also be altered by the RF electronic transition. For example, the QSS system 100 may include a third laser system which may include a third laser (e.g., an auxiliary coupling laser) which can produce an auxiliary coupling laser for resonant with other transitions. In some instances, the example QSS system 100 may include a fourth laser system which may include a fourth laser and an associated frequency comb generator for phase and amplitude fast scanning. In some instances, the QSS system may further include other optical devices or components.

In some instances, the vapor cell sensor 106 can be omni-directional and self-calibrated. In some instances, the vapor cell sensor 106 can be implemented with a wide carrier bandwidth so that the vapor cell sensor 106 does not need to be changed in order to detect the electromagnetic radiation. In some instances, each vapor cell sensor 106 may include a narrow bandwidth vapor cell sensor, e.g., a photonic crystal receiver.

In some instances, each of the vapor cell sensors 106 is communicably coupled through waveguides, e.g., fiber optic cable, to the probe laser system 102, the coupling laser system 104, and the optical detectors 108. Additionally, a mounting system for the vapor cell sensors 106 can be included, such as a plastic tripod mount and a plastic mount for the vapor cell sensor configured to attach to the mount, plastic aerials, etc. The vapor cell sensors 106 can be removed from a backpack so that they can be positioned around the backpack with the control system 120 and the laser systems 102, 104. An array of vapor cell sensors 106 can be configured in a regular array by fixing the vapor cell sensors 106 into a form, made of plastic, or another dielectric material. The vapor cell sensors 106 can be detached; or the array can be disassembled, and the arrangement of the array can be reconfigured, such as a long baseline antenna for angle of arrival determination. The laser systems 102, 104 may be shared by the multiple vapor cell sensors 106 using a system of light splitters, switches, a photonic integrated circuit, or in another manner. In some instances, each vapor cell sensor 106 may include collection and focusing elements such as lenses or other optical components.

In some instances, an output optical signal 146 from a vapor cell sensor 106 can be generated based on electromagnetically induced transparency (EIT) or electromagnetically induced absorption (EIA) when frequency components from the first and second frequency comb signals 118, 138 are resonantly coupled to atomic states of a vapor in the vapor cell sensor. In some instances, a sub-Doppler method is useful for higher spectral resolution in the Autler-Townes regime and higher sensitivity. The output optical signal 146 is received by one or more optical detectors 108. In some implementations, the optical detector 108 is configured to receive a set of optical signals from the vapor cell sensors and convert the set of optical signals to analog electrical signals. The signal processing system 110 is in communication with the optical detector 108. The signal processing system 110 is configured to receive the analog electrical signals from the optical detector 108; to convert the analog electrical signals to digital signals; to process the digital signals; and to detect (e.g., measure) the properties of an optical spectrum at one or more of the comb frequencies of the second frequency comb signal 136. The signal processing system 110 is configured to generate data representing the properties of the optical spectrum at the one or more comb frequencies of the second frequency comb signal 136.

Figure 1B:
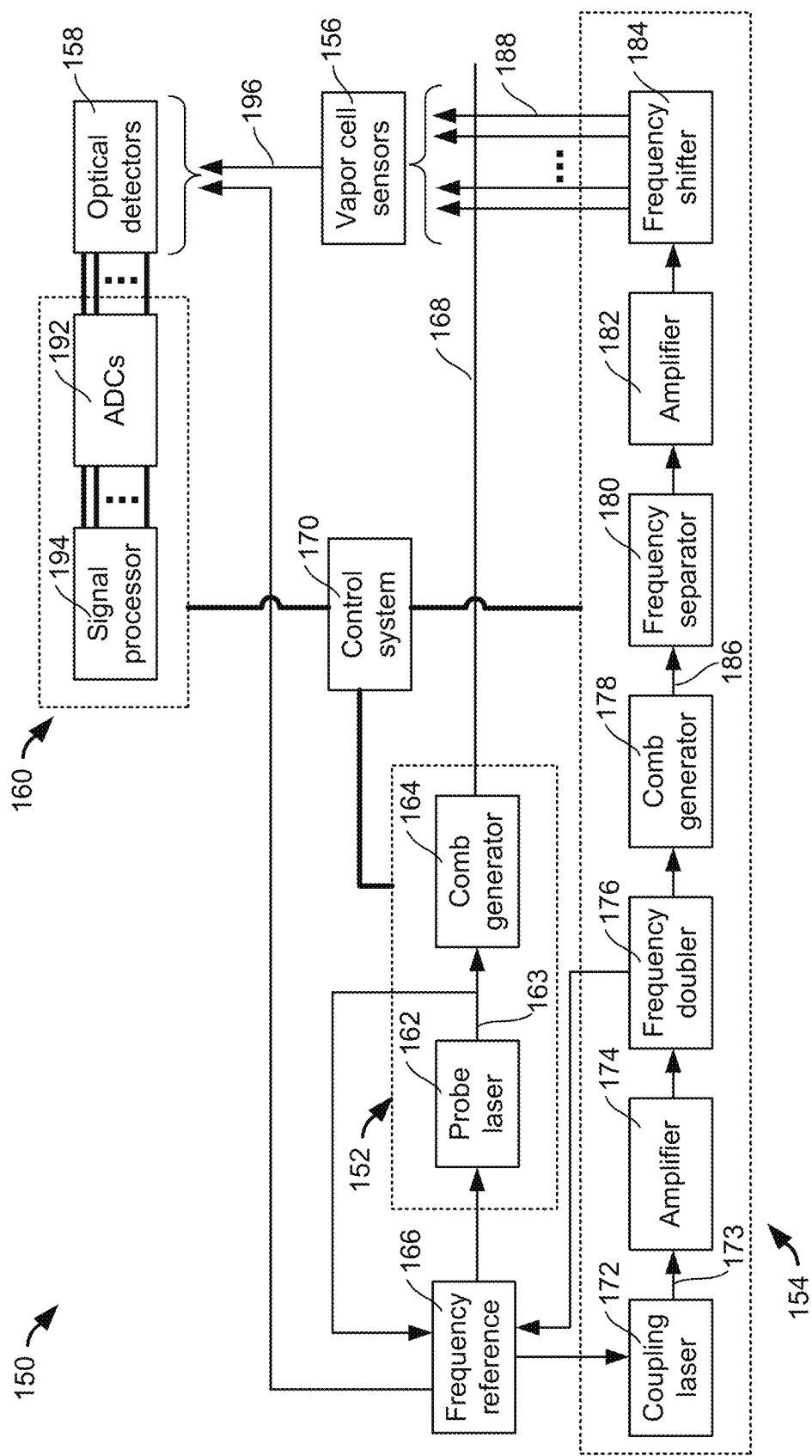

The example QSS system 100 may further include a memory unit configured to store instructions for one or more processors 144 in the signal processing system 110. The instructions, when executed by the one or more processors 144, may be configured to perform operations such as determining, based on the data, the properties of the electromagnetic radiation received at the vapor cell sensors 106. As shown in FIGS. 1A-1B, the signal processing system 110 includes analog-to-digital converters (ADCs) 142 configured to convert analog signals generated by the optical detectors 108 to digital signals. The digital signals can then be communicated to the processor 144 configured to process and analyze the digital signals. In some instances, the processor 144 may include a Field Programmable Gate Arrays (FPGAs) board where a Fourier transformation on the digitized data, to obtain a frequency spectrum. In some instances, the processor 144 may be configured to perform other transformation operations such as Laplace, wavelet, etc. If electromagnetic radiation is present at the vapor cell sensor 106, a change in the transmission of the probe laser signal at an RF frequency detuning can be detected in the frequency spectrum. The EIT/EIA spectrum (e.g., properties of off-resonance peaks) can be used to determine the properties of the electromagnetic radiation received at the vapor cell sensor 106. In some instances, the wavelength/frequency of the frequency component 138 can be rapidly changed to shift the RF sensing window.

In some implementations, the control system 120 is configured to communicate control signals to the laser systems 102, 104, the signal processing system 110, and other components or devices of the example QSS system 100. In some instances, the control system 120 is configured to provide feedback to control the probe and coupling lasers 112, 122, including feed forwards. For example, the control system 120 includes FPGAs, analog electronics, custom RF electronics (e.g., RFSoC), or another processor-based system that can be controlled through a user interface and through autonomous control layers operating in different types of processors. In some instances, the QSS system 100 can be configured to scan several different bands simultaneously. In some implementations, the signal processing system 110 and the control system 120 may be part of an integrated system-on-chip (SoC) for control and digital signal processing. For example, the signal processing system 110 may include a specialized FPGA board with a CPU processor.

For example, if the bandwidth of the first frequency comb signal 118 is 100 MHz then the first frequency comb signal 118 might be up-shifted by 120 MHz so that the full bandwidth of the beat frequencies can be detected by the optical detectors 108. In some instances, the signal processing system 110 may be a swept frequency spectrum analyzer, a real-time spectrum analyzer, or another type of spectrum analyzer. At frequencies less than 5 GHz, real-time digital signal processing solutions can be convenient. In the amplitude regime, where the amplitude of the optical spectrum is used to deduce the electromagnetic field amplitude, the method can still be useful since the entire line shape can be measured, reducing noise since small frequency fluctuations of the peak center can be observed and compensated. Analogous principles can be used to carry out comb spectroscopy using a three-photon process by modulating the probe laser signal 113. For example, the QSS system 100 may include multiple agile laser systems (e.g., two or more coupling laser systems 104, 154, 300 in FIGS. 1A-1B, 3), for example, at different frequencies to provide closed loop systems for reading out phase optically. In some instances, other multi-photon detection schemes may be possible.

In some instances, the example QSS system 100 includes multiple vapor cell sensors 106 configured in an array with a reconfigurable topology. In some instances, each vapor cell sensor 106 can be configured to sense a respective frequency range enabling faster scanning of multiple frequency bands and concentration on specific frequency bands. The multiple vapor cell sensors 106 can be distributed over a large area.

In some instances, an array of vapor cell sensors 106 can be configured to sense different RF frequencies; determine angle of arrival; and other provides other functions. The multiple vapor cell sensors 106 in an array can be configured to have a longer baseline increasing the angle resolution for angle of arrival detection; and signal size can be increased by adding signals together without increasing interference.

The example QSS system 100 can allow for different subsets of an array of vapor cell sensors 106 to simultaneously sense electromagnetic radiation with different frequencies. The QSS system 100 can also enable a single vapor cell sensor 106 to simultaneously detect electromagnetic radiation at different frequencies. By taking advantage of the Doppler shifts of the moving atoms, different atomic velocity groups can sense electromagnetic radiation at different frequencies in the same vapor cell sensor 106, allowing off-resonance measurement, in which the frequency components in the first frequency comb signal 118 from the probe laser system 102 is near the resonance of an atomic transition. In other words, in the off-resonance measurement, the frequency components of the first frequency comb signal 118 are not tuned exactly to the resonance of the atomic transition, but slightly detuned from the resonance. An example off-resonance measurement is shown in FIGS. 6, 7, 8A-8B.

In some instances, the QSS system 100 may further include optical waveguide circuits, fiber optics, free-space optics, optical test benching, and other optical circuits and devices. In some examples, the example QSS system 100 includes a GPS receiver or another type of location detection system which is configured to provide geolocation data associated with each of the vapor cell sensors 106. For reducing any perturbation caused by the GPS receiver, the GPS receiver is included in the control system 120, for example with a control package. In certain cases, the control system 120 also includes a clock configured to provide timing data. In some instances, the timing data is associated with the detected output optical signal generated by the optical detector 108 upon receiving the output optical signals from the vapor cell sensors. For example, the clock may be an atomic clock, thermally stabilized crystal oscillator, or another type of clock. In certain instances, the clock can be steered by the GPS timing signal. The example QSS system 100 can be battery powered for remote field testing, plugged into wall power, or both. Some remote testing can allow for power supplied by a generator, such as a vehicle engine running an alternator to charge a battery and supply DC power.

In some instances, the QSS system 100 can meet the challenges of wide bandwidth spectrum sensing. In some cases, the system can simultaneously be used to calibrate and configure other RF equipment for electronic protection and force spectrum management. In some examples, the QSS system 100 can be hardened (e.g., structurally reinforced to endure environmental stress) to meet deployment specifications, e.g., requirement standard specified in MIL-STD-180 (U.S. Department of Defense Test Method Standard, Environmental Engineering Considerations and Laboratory Tests). The QSS system 100 can be designed to be field-portable when it has to be carried by a 5G-6G field technician or by soldiers to characterize the RF spectrum at different sites in order to predict phenomena such as interference. The QSS system 100 can be configured to operate in all types of weather and be covert and passive. The QSS system 100 can operate in a large frequency range, for example, spanning around 0.1-100 GHz, UHF to W-band to gather intelligence for planning and operations in electronic warfare. In some implementations, the example QSS system 100 has a sensing bandwidth of 0.1-100 GHz, a RF transition switching time of 50 µs; a dwell time of 1 ms, an on-resonance sensitivity of greater than −130 dBm/Hz, an off-resonance sensitivity of greater than −100 dBm/Hz, and a time to scan 100 GHz of 0.5 s. In some instances, the example QSS system 100 may have other characteristics of other values.

In some instances, multiple QSS systems 100 can be linked together in the field to form a larger quantum spectrum sensing (QSS) network, including the formation of a large area antenna The linking can be accomplished fiber optically or with wired and/or wireless connections. The different QSS systems in a QSS network can be located using GPS or other types of location detection systems. Signal processing can occur locally in each QSS system 100 or collectively at a data hub (e.g., a selected QSS system within the QSS network or a data processing center as a central computing node). For example, the QSS system 100 can perform fast scans to identify regions of interest from UHF-W-band. Once the regions of interest are identified, the QSS system 100 can be configured to focus on the regions of interest with longer dwell times or to focus on acquiring the signals of interest in real-time. In some instances, the data can then be communicated to the data hub to decode, analyze, interpret, plan for future operations, or other purposes.

FIG. 1B is a block diagram showing aspects of an example QSS system 150. As shown in FIG. 1B, the example QSS system 150 includes a probe laser system 152, a coupling laser system 154, one or more vapor cell sensors 156, one or more optical detectors 158, and a signal processing system 160. As shown in FIG. 1B, the probe laser system 152 includes a probe laser 162 and a first comb generator 164. The probe laser system 152 may be implemented as the probe laser system 102 in the example QSS system 100 shown in FIG. 1A; and the probe laser 162 and the first comb generator 164 may be implemented and operated as the corresponding components of the probe laser system 102 in FIG. 1A. The coupling laser system 154 includes a coupling laser 172, a first amplifier 174, a frequency doubler 176, a second comb generator 178, a frequency separator 180, a second amplifier 182, and a frequency shifter 184. In some instances, the coupling laser system 154 may be implemented as the coupling laser system 104 of the example QSS system 100 shown in FIG. 1A; and the coupling laser 172, the second comb generator 178, the frequency separator 180, and the frequency shifter 184 may be implemented and operated as the corresponding components of the coupling laser system 104 in FIG. 1A. In some instances, the frequency separator 180 may be implemented as the frequency separator 311 shown in FIG. 3 or in another manner. The vapor cell sensors 156, the optical detectors 158, the signal processing system 160, and the control system 170 may be implemented as the corresponding components of the example QSS system 100 shown in FIG. 1A or in another manner. The example QSS system 150 may include additional or different features, and the components of the example QSS system 150 may operate as described with respect to FIG. 1B or in another manner. In some instances, the example QSS system 150 may be operated according to the process 400 shown in FIG. 4 or in another manner.

As shown in FIG. 1B, the direct coupling laser output signal 173 can be amplified by the first amplifier 174; and the amplified direct coupling laser output signal can be used to generate the second frequency comb signal 186 spanning the desired wavelength range by the second comb generator 178.

In some implementations, each of the first and second amplifiers 174, 182 is an optical amplifier which may include a semiconductor optical amplifier, a tapered amplifier, a fiber amplifier, or another type of amplifier. In some instances, the second amplifier 182 may have a broad enough spectral bandwidth to amplify an optical signal at each comb tooth of the second frequency comb signal 186. The amplification may be the same for each comb tooth. In some variations, the second amplifier 182 may be seeded by the power of an output from the fine-tuning element. If the power of the output from the fine-tuning element is too small, then amplification at intermediate stages can be implemented. For example, the output from the second comb generator 178 or the optical switch of the frequency separator 180 can be amplified to compensate for loss or lower comb tooth power. It is valuable to have enough seed power for the final amplification because if the power from the weakest fine-shifted comb tooth is above the saturation point of the amplifier, the output power can be more uniform across the entire system spectral bandwidth. In these variations, the first amplifier 174 may amplify only at the center frequency of the CW laser of the coupling laser 172. The second amplifier 182, in many cases, will be strong enough to increase the power per comb tooth as the amplified power can be distributed amongst many comb teeth.

As shown in FIG. 1B, the amplified direct coupling laser output can be split by operation of the frequency doubler 176. One portion of the output of the frequency doubler 176 can serve as a frequency reference for heterodyne readout. The other portion can be communicated to the second comb generator 178 and used to generate the second frequency comb signal 186. In some implementations, the frequency doubler 176 is configured to perform a process of doubling the frequency of the amplified coupling laser signal. In some instances, the frequency doubler 176 includes a device or system that achieves second harmonic generation, e.g., nonlinear crystals such as lithium niobate, beta barium borate, or potassium titanyl phosphate, that allows the incoming fundamental light to convert into its second harmonic. In some instances, the frequency doubler 176 may be configured to perform a nonlinear optical process to achieve the second harmonic generation. In some instances, the frequency doubler 176 includes an amplifier, where the doubling crystal is included in the amplifier to perform intracavity doubling.

The second frequency comb signal 186 includes multiple comb lines with frequency spacings in a range of ~10 kHz-1 MHz. The second frequency comb signal 186 with a bandwidth up to 1 GHz can then be communicated to the one or more vapor cell sensors 156. The one or more frequency components 188 of the second frequency comb signal 186 are communicated through the vapor cell sensors 156 in the presence of the first frequency comb signal 168 (e.g., counter or co-propagating); and is directed to the one or more optical detectors 188 where it is mixed with the reference signal from the frequency reference 166. In some instances, each vapor cell sensor 156 may receive the same frequency components 188 of the second frequency comb signal 186. In certain examples, different vapor cell sensors 156 may receive respective subsets of frequency components 188 of the second frequency comb signal 186. In some instances, multiple different frequency components 188 can be routed to the same vapor cell sensor 156. Different combinations of these extremes may be enabled by operation of the frequency shifter 184.

After the frequency separator 180, the multiple frequency components can be recombined into a unified output and then amplified to the desired optical output power by operation of the second amplifier 182. In some instances, the multiple frequency components may not need to be combined prior to being amplified. In some instances, frequencies of the amplified frequency components of the second frequency comb signal 186 can be fine-tuned by operation of respective frequency shifters 184. In some instances, each frequency shifter 184 may include an electro-optic modulator (EOM), to shift the frequency of a frequency component to a desired value. In some instances, an electro-optic modulator can be configured as an IQ modulator (e.g., in a Mach-Zehnder configuration), which can allow for modulation of a single sideband suppressed carrier (SSB-SC). In some instances, the frequency shifter 184 may be implemented as the frequency shifter 320 in the example coupling laser system 300 in FIG. 3 or in another manner. In some instances, the comb spacing is less than the spectral range of the frequency shifter 184 to ensure continuous coverage. For example, the frequencies of the frequency components in the second frequency comb signal 186 may be separated from each other by a common frequency spacing. As such, the frequency shifter 184 may be configured to shift the frequency of the selected frequency component by a frequency magnitude no less than the common frequency spacing. In some implementations, the frequency shifter 184 includes a photonic integrated circuit for electro-optic frequency shifting and switching. In some instances, the photonic integrated circuit may include thin film materials such as silicon nitride, tantalum pentoxide, lithium niobate, or other materials for filtering, routing and laser stabilization. In some instances, the coupling laser system 154 may be implemented as the coupling laser system 300 shown in FIG. 3 or in another manner.

In some implementations, the probe laser 162 is chosen as the optical source for the first frequency comb signal 168 because it may be necessary to resolve the optical transmission associated with each comb line or detuning from resonance. To do so, the first frequency comb signal 168 after passing through the vapor cell sensor 156 may be beat (or combined) with a reference optical signal (or local oscillator) from the frequency reference 166. As shown in FIG. 1B, the reference optical signal may be a second portion of the probe laser signal 163. In some instances, the reference optical signal may be obtained in another manner. The combination of the optical spectrum 196 and the reference optical signal form a heterodyne optical spectrum, which is based on a fundamental frequency of the probe laser signal 163 but shifted by a frequency such that a bandwidth of the optical spectrum can be detected by the optical detectors 158 and the signal processing system 160.

Figure 2A:
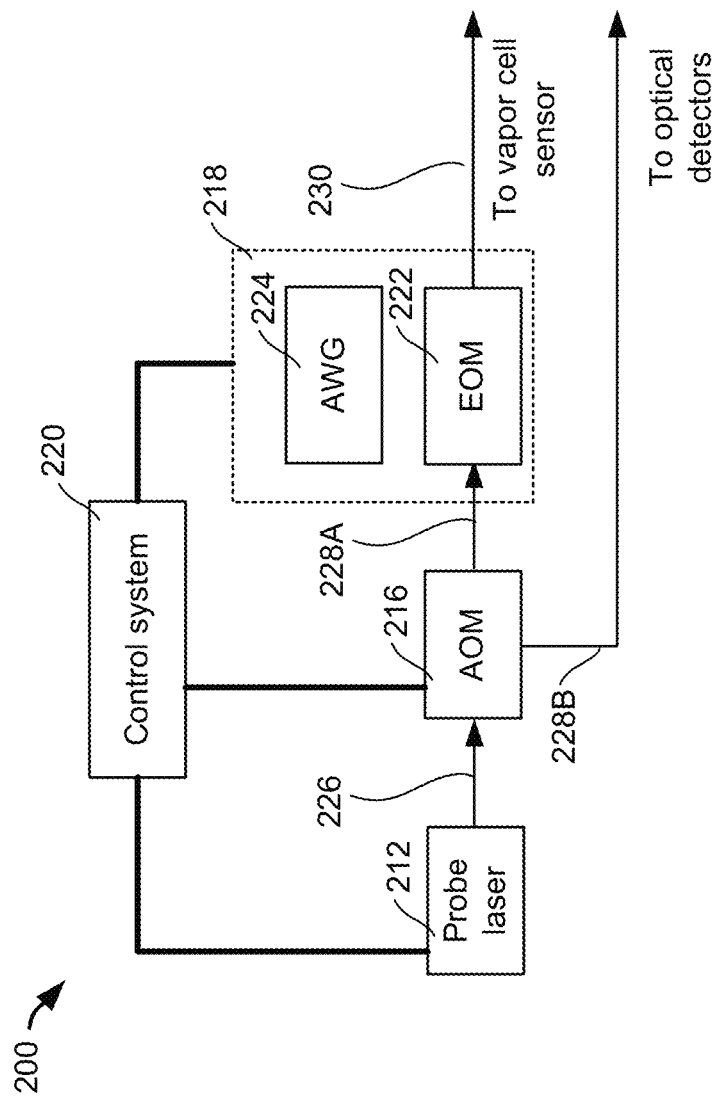
FIG. 2A is a block diagram of an example probe laser system.

FIG. 2A is a schematic diagram showing an example probe laser system 200. As shown in FIG. 2A, the probe laser system 200 includes a probe laser 212 configured to generate a probe laser signal 226 and a comb generator 218 configured to generate a frequency comb signal 230. In some implementations, the frequency comb signal 230 includes multiple comb lines or frequency components with respective comb frequencies. In some instances, the probe lasers 212 may be a semiconductor laser, a fiber laser, an amplified laser, or another type of laser. As shown in FIG. 2A, the probe laser system 200 further includes an acousto-optic modulator (AOM) 216 configured to receive the probe laser signal 226 from the probe laser 212; and split the probe laser signal 226 into two distinct portions, e.g., first and second portions 228A, 228B. In some instances, the probe laser 212 may be locked to respective reference frequencies. In some instances, the probe laser 212 may be implemented as the probe laser 112, 162 in FIGS. 1A-1B, or in another manner. The example probe laser system 200 may include additional or different features, and the components of the example probe laser system 200 may operate as described with respect to FIG. 2A or in another manner. For example, the probe laser system 200 may further include lenses, mirrors, diffraction gratings, beam splitters, and other optical components to define optical pathways for the optical signals generated at different stages of the probe laser system 200.

In some instances, the AOM 216 can be configured to cause a shift of the frequency of the second portion 228B to a value different from (e.g., higher or lower than) the frequency of the first portion 228A. The second portion 228B, which serves as the reference optical signal (or local oscillator), may then be combined with the frequency comb signal 230 after passing through a vapor cell sensor (e.g., the vapor cell sensor 106, 156 in FIGS. 1A-1B) to produce a heterodyne optical spectrum. Properties of the heterodyne optical spectrum at the one or more comb frequencies (e.g., a subset of comb frequencies or all comb frequencies of the frequency comb signal 230, etc.) can be detected and analyzed. Examples of the properties of the heterodyne optical spectrum include an amplitude, a polarization, a phase, and other properties.

As shown in FIG. 2A, the comb generator 218 includes an electro-optic modulator (EOM) 222 and an arbitrary waveform generator (AWG) 224. In the example shown in FIG. 2A, the frequency comb signal 230 is an optical signal produced by the comb generator 218 having a comb-shaped frequency profile that is defined by multiple comb lines at respective comb frequencies. The frequency comb signal 230 may be implemented as the frequency comb signal 118, 168 in FIGS. 1A-1B, or in another manner In some implementations, the EOM 222 is in communication with the AWG 224; and the frequency comb signal 230 is generated using the EOM 222, which in turn, is driven by the AWG 224. The form of a drive signal from the AWG 224 controls spread of frequencies (or overall bandwidth), comb tooth spacing, and other characteristics of the frequency comb signal 230. The frequency comb signal 230 is defined by a series of comb lines whose density within a frequency range (or bandwidth) can be large enough to become quasi-continuous across the probe laser frequencies of interest. For example, the frequency comb signal 230 may correspond to a sum of comb lines at discrete positions within the frequency range. One or both of the spacing between the comb lines and the bandwidth of the frequency comb signal 230 may thus be controlled to make the frequency comb signal 230 quasi-continuous. In some instances, a quasi-continuous frequency comb signal corresponds to a spacing that is greater than one half the line width of the first portion 228A of the probe laser 226. In some instances, the frequency comb signal 230 may be based on a frequency spacing between adjacent comb lines that is no greater than 100 kHz, 10 kHz, or another value.

In some instances, the comb generator 218 may include multiple EOMs 222 in communication with a single AWG 224. In certain examples, the comb generator 218 may include multiple EOMs 222 in communication with different, respective AWGs 224. In some instances, the multiple EOMs 222 may allow the comb generator 218 to increase the number of comb lines in the frequency comb signal 230; to increase the bandwidth of the frequency comb signal 230, or both. In some instances, the comb generator 218 may be based on a mode-locked laser, an optical micro-resonator, a nonlinear optical fiber, an acousto-optic modulator, or other types of comb generators. In some instances, the comb generator 218 may include other optical components.

In some implementations, the probe laser system 200 communicates with a control system 220 which is electrically connected to the probe laser 212, the AOM 216, and the comb generator 218 to adjust parameters of the probe laser system 200. In some instances, the control system 220 may be coupled to other components of the probe laser system 200 to control other parameters. In some implementations, the control system 220 includes computation apparatus, a memory unit, an input/output interface, or other components that allow the communication of the control system 220 with other components of the probe laser system 200, determine control parameter values of the components of the probe laser system 200, and optimize the frequency comb signal produced by the probe laser system 200. In some instances, the control system 220 may be configured for performing other functions.

In some instances, the frequency comb signal 230 can be routed to one or more Rydberg atom-based vapor cell sensors, each of which may be implemented as the vapor cell sensor 106, 156 in FIGS. 1A-1B, or in another manner. The atoms in the vapor cell sensor can interact with the frequency comb signal 230, other laser signals (e.g., a second frequency comb signal from a coupling laser), and electromagnetic radiation; and generate a set of output optical signals based on the interaction. In some implementations, the set of output optical signals and the second portion of the probe laser signal 228B are received by the same optical detector or different optical detectors (e.g., the optical detector 108, 158 in FIGS. 1A-1B). In some instances, the set of output optical signals from the vapor cell sensor may represent an optical transmission of the atoms at the comb frequencies. The properties of the set of output optical signals, such as an amplitude, a polarization, a phase, etc., are affected by the electromagnetic radiation received at the vapor cell sensor. In other words, the properties of the output optical signals change in response to electromagnetic radiation interacting with the atoms in the vapor cell sensor. Such changes in the set of output optical signals produced by the vapor cell sensor may correspond to a change in a property (e.g., change in power, angular orientation, angular shift, etc.) of the electromagnetic radiation. In many cases, a detectable change in the properties of the set of output optical signals allows a detection of the electromagnetic radiation incident on the vapor cell sensor and to determine one or more properties of the electromagnetic radiation (e.g., amplitude, frequency, phase, phase change, polarization, etc.).

During operation, the comb generator 218 may allow an example QSS system to determine a profile of the EIT-based or EIA-based peak across a large bandwidth. For example, each comb frequency of the frequency comb signal 230 may allow a measurement of the peak simultaneously at multiple frequencies across a range of frequencies occupied by the peak. Such simultaneous measurement is notably faster than measuring individual frequencies iteratively across the range. In some implementations, simultaneous measurement allows a determination of the profile of the peak more accurately, especially under conditions where the peak rapidly changes in response to fluctuations of the electromagnetic radiation.

In some instances, the frequency comb signal 230 can eliminate the need to scan the probe laser 212. The comb generator 218 is used to generate a frequency comb signal at all desired probe laser detuning values. To readout the transmission at each of the comb frequencies, the light transmitted through the vapor cell sensor is directed by a high bandwidth (~1 GHz) optical detector where it is beat against light (e.g., the second portion 228B) at the fundamental frequency of the probe laser 212, as shown in FIG. 2A. The electrical signal generated by the optical detector can be digitized and the Fourier transformed in real-time to generate a spectrum across the extent of the probe laser frequency comb, e.g., a real-time spectrum analysis.

Figure 2B:
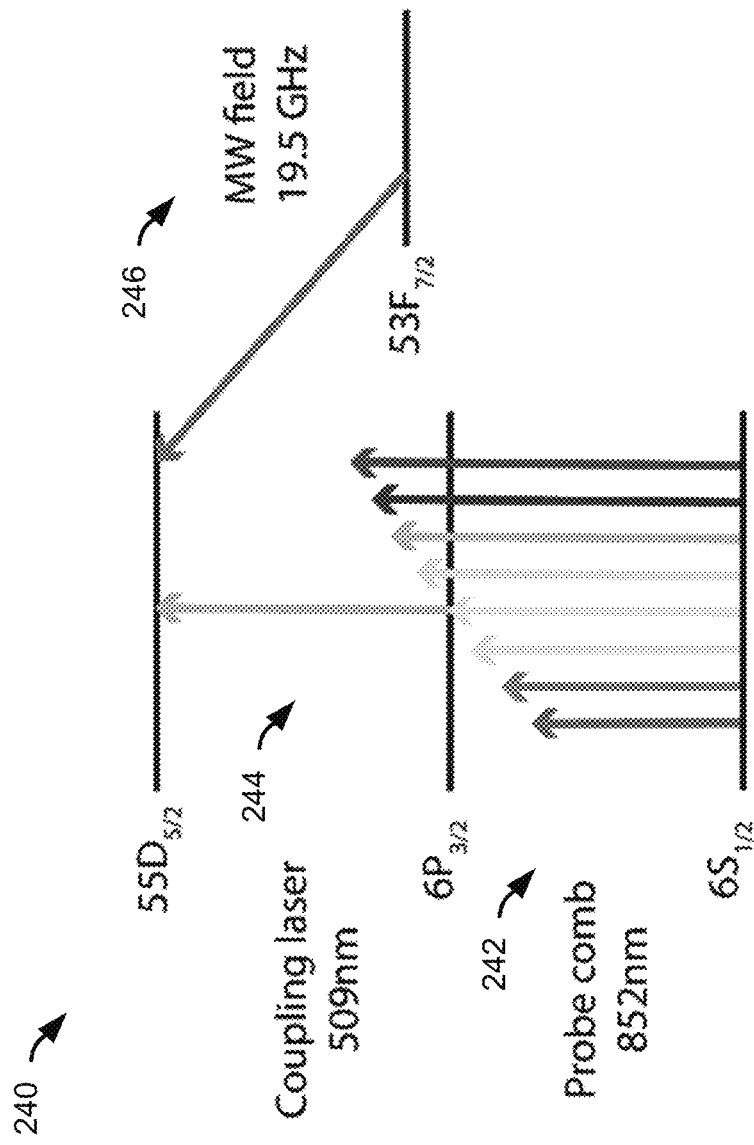
FIG. 2B is a schematic diagram of an example electron energy level structure for a two-photon measurement that uses a frequency comb and is based on Cs atoms in a vapor state.

FIG. 2B is a schematic diagram 240 of an example electron energy level structure for a two-photon measurement based on Cs atoms in a vapor state. A frequency comb signal 242 is used to interact with the $6S_{1/2}$-to-$6P_{3/2}$ optical electronic transition, as shown by the multiple comb lines extending from the $6S_{1/2}$ energy level towards the $6P_{3/2}$ energy level (or thereabouts). The frequency comb signal 242 is generated from a probe laser signal (e.g., the probe laser signal 113, 163, 226 generated in the probe laser system 102, 152, 200 shown in FIGS. 1A-1B, 2A) having a wavelength of approximately 852 nm; and may be analogous to the frequency comb signal 230 described in relation to FIG. 2A. A coupling laser signal 244 (e.g., the coupling laser signal 123, 173, 304 generated by the coupling laser system 104, 154, 300 shown in FIGS. 1A-1B, 3) having a wavelength of approximately 509 nm is used to interact with the $6P_{3/2}$-to-$55D_{5/2}$ optical electronic transition. In FIG. 2B, the frequency comb signal 242 is illustrated with eight example comb lines. However, other numbers of comb lines are possible. For example, the frequency comb signal 242 may include 10,000 comb lines that span a frequency range (or bandwidth) of 100 MHz. Moreover, the comb lines may have various respective powers that define a power profile (e.g., a uniform profile, a gradient profile, a sinusoidal profile, etc.). For example, the comb lines in the frequency comb signal 242 may be relatively uniform in profile within a power variation within 3.06 dB.

As shown in FIG. 2B, the Cs atoms in a vapor state also have a $53F_{7/2}$-to-$55D_{5/2}$ optical electronic transition. Electromagnetic radiation may interact with this transition, thereby altering an absorption of light by one or both of the $6S_{1/2}$-to-$6P_{3/2}$ optical electronic transition and the $6P_{3/2}$-to-$55D_{5/2}$ optical electronic transition. For example, an electromagnetic radiation with a frequency of approximately 19.5 GHz may be used to alter an absorption of the frequency comb signal 242 by the $6S_{1/2}$-to-$6P_{3/2}$ optical electronic transition. Such absorption may serve as a basis for detecting the electromagnetic radiation as well as measuring characteristics of the electromagnetic radiation. The presence of multiple comb lines allows the profile of the EIT peak (e.g., its spectral line shape) to be resolved simultaneously at multiple frequencies.

FIG. 3 is a block diagram of an example coupling laser system 300. In some instances, the example coupling laser system 300 may be part of a QSS system, e.g., the example QSS system 100, 150 in FIGS. 1A-1B. In some instances, an example QSS system may include multiple coupling laser systems 300 to implement optically closed loop configurations where phase and amplitude can be detected simultaneously. During operation, the coupling laser system 300 may be configured to output a highly tunable, agile, and stable coupling laser signal with one or more target wavelengths or frequencies. In some implementations, the coupling laser system 300 can be configured to switch among different target wavelengths across tens of nanometers in less than 10 μs while maintaining a spectral bandwidth of less than 1 MHz. In certain examples, the coupling laser system 300 does not need to be relocked when switching among different target wavelengths, which can improve the robustness of the locking and reduce the switching time (e.g., less than 1 ms). In some implementations, the example coupling laser system 300 is configured to allow a QSS system to rapidly switch between Rydberg states; and to generate one or more frequency components of a frequency comb signal to detect electromagnetic radiation of multiple frequencies at the same time. In some instances, the one or more frequency components of the frequency comb signal generated by the coupling laser system 300 can be routed to a single vapor cell sensor; or respective subsets of frequency components may be routed to respective vapor cell sensors of a QSS system. In certain examples, the coupling laser system 300 may allow a QSS system to scan a frequency range of 100 GHz in less than 1 s. The coupling laser system 300 enables a QSS system to be reconfigured according to a specific application or a particular task. In some implementations, a QSS system using the coupling laser system 300 may switch among different target frequencies of the electromagnetic radiation at high speed.

As shown in FIG. 3, the example coupling laser system 300 includes a coupling laser 302, a laser stabilizer 306, a comb generator 308, a frequency separator 311, and a frequency shifter 320. The frequency separator 311 includes a frequency disperser 312 and a frequency selector 316. In some instances, each optical component of the example coupling laser system 300 can be optically coupled through optical fibers or another type of optical waveguide. In some instances, the coupling laser system 300 can be configured to produce an output laser signal 324. In some instances, the output laser signal of the coupling laser system 300 includes one or more frequency components of a frequency comb signal 310. In some instances, frequencies of the one or more frequency components of the frequency comb signal 310 may be shifted. The example coupling laser system 300 may include additional or different features, and the components of the example coupling laser system 300 may operate as described with respect to FIG. 3 or in another manner. For example, the example coupling laser system 300 may include amplifiers, filters, waveguides, or other optical components for communicating optical signals between the subsystems of the example coupling laser system 300. For another example, various amplifiers can be used throughout the coupling laser system 300 to boost the signal levels and compensate for losses within the coupling laser system 300.

In some instances, the coupling laser 302 may be a continuous wave (CW) laser, a narrow bandwidth laser, a fiber laser, a distributed feedback (DFB) laser, or a Bragg reflector (DBR) laser, or another type of laser. In some instances, the coupling laser 302 may be implemented as the coupling laser 122, 172 in FIGS. 1A-1B or in another manner.

As shown in FIG. 3, the direct coupling laser output signal 304 is a frequency-locked output of the coupling laser 302 (e.g., a continuous wave laser) by operation of the laser stabilizer 306 in a feedback loop. In some implementations, the laser stabilizer 306 is configured to ensure the coupling laser 302 maintains a precise and stable frequency. In some instances, the laser stabilizer 306 may include a vapor cell sensor having a vapor therein. The frequency locked output of the coupling laser 302 may be based on an electronic transition of the vapor. In certain examples, the laser stabilizer 306 may include an optical cavity (e.g., an interferometer); and the frequency-locked output of the coupling laser 302 may be based on an output frequency of the optical cavity, such as determined by an optical path length of the optical cavity. In some instances, the output frequency may be associated with a reflected beam from the optical cavity, or a transmitted beam from the optical cavity. In some instances, the laser stabilizer 306 may include electronic feedback control (e.g., receiving control signals from the control system 322); and may be based on other stabilization technologies. In some instances, the laser stabilizer 306 may include an interferometer (e.g., a Fabry-Perot cavity). In this case, the frequency locked output of the coupling laser 302 may be based on an output frequency of the optical cavity, such as determined by an optical path length of the optical cavity. In some instances, the output frequency may be associated with a reflected beam from the optical cavity, or a transmitted beam from the optical cavity. In some instances, the laser stabilizer 306 may include a vapor cell sensor having a vapor that can provide a molecular or atomic spectral feature. In this case, the frequency locked output of the coupling laser 302 may be based on an electronic transition of the vapor. In some instances, the laser stabilizer 306 may include electronic feedback control; and may be based on other stabilization technologies.

In some implementations, the comb generator 308 is configured to generate a frequency comb signal 310 based on the direct coupling laser output signal 304. In some instances, the direct coupling laser output signal 304 coming out of the coupling laser 302 can be amplified prior to being received at the comb generator 308. In some implementations, the frequency comb signal 310 includes multiple comb lines at respective comb frequencies; and spans a frequency range over which the output coupling laser of the coupling laser system 300 needs to be tuned to reach all the necessary Rydberg states of atoms in a vapor cell sensor (e.g., the vapor cell sensors 106, 156 in the example QSS system 100, 150 shown in FIGS. 1A-1B). In some instances, the comb generator 308 may be configured according to the coupling laser 302 used. For example, when the coupling laser 302 is a single frequency CW laser, the frequency comb generator 308 may include electro-optic modulators, which can impose tens of sidebands as the comb lines. For another example, when the coupling laser 302 is a mode-locked laser, the frequency comb generator 308 may include an optical atomic clock. During operation, a precise measurement of oscillations of the laser signal from the coupling laser 302 can be performed by the optical atomic clock (e.g., for precise measurement of its frequency). In this case, the optical output of the mode-locked laser may be a periodic train of optical pulses with a period T, which can be expressed as a Fourier series of optical frequencies with an equal spacing $f_{rep}$ in the frequency domain. As another example, the frequency comb generator 308 may include a micro-resonator waveguide (e.g., a so-called Kerr-type frequency comb generator). A single frequency pump source may be resonant with a micro-resonator waveguide. Moreover, the single frequency pump source may generate an output that can be converted into a frequency comb via degenerate and non-degenerate four-wave mixing processes. For another example, the frequency comb signal 310 may be generated from a phase modulated single frequency laser.

The frequency comb signal 310 generated by the comb generator 308 is an optical spectrum defined as equidistant spectral lines in the frequency domain. Each spectral line can be referred to as a comb tooth, a comb line, or a frequency component; and may define an equal frequency spacing of modes in the optical spectrum. In this case, the frequency comb signal 310 is used as an optical ruler to measure unknown frequencies with the beat notes between the unknown frequency and the known comb lines. Such measurement may allow for the transfer of phase and frequency information from a high stability reference to thousands of comb lines. The frequency comb signal 310 can be used in applications such as frequency metrology, precision spectroscopy, and distance measurement. Moreover, the frequency comb signal 310 may be capable of highly agile repetition rates. For instance, the tuning of the mode spacing in an electro-optic frequency comb can benefit from the high-frequency, large bandwidth, and highly efficient lithium niobate waveguide modulators.

In some implementations, the frequency disperser 312 of the frequency separator 311 is configured to receive the frequency comb signal 310 on an input optical channel and spatially separate the multiple frequency components (e.g., comb lines) of the frequency comb signal 310 onto respective output optical channels of the frequency disperser 312. Output optical channels 314 of the frequency disperser 312 may be spatially separate from one another (e.g., be physically separated from one another by a distance).

In some instances, the frequency disperser 312 includes one or more dispersive elements; and the dispersive element may be constructed in several different ways. For example, the dispersive element includes an arrayed waveguide grating, which can also be used as a demultiplexer and/or multiplexer for optical signal processing. In some instances, an arrayed waveguide grating can be constructed as a planar light wave circuit that uses interference to separate different wavelengths of light carried in a single optical fiber into an array of optical fibers, each carrying a wavelength of light defined by the spectral bandwidth and frequency spacing of the output channels of an arrayed waveguide grating.

In some instances, the dispersive element of the frequency disperser 312 may include a photonic integrated circuit that incorporates ring resonators. Each ring resonator has a resonance spectral bandwidth that can be defined by engineering a quality factor or finesse of the ring resonator. The ring resonators may also be tuned into resonance with a specific wavelength by altering their temperature, by straining their structure with a piezoelectric, or both. When integrated into the coupling laser system 300, the output from the comb generator 308 may be coupled into the photonic integrated circuit of the frequency disperser 312, which has one or more different ring resonators coupled to the output channel of the comb generator 308. Specific wavelengths of light can be selected by tuning a particular ring resonator so that it is resonant with the target wavelength. Light captured in the ring resonator can then be coupled into an output channel of the photonic integrated circuit.

In some implementations, the frequency selector 316 is configured to select an output optical channel of the frequency disperser 312 and output a respective frequency component on that selected output optical channel of the frequency disperser 312. In some instances, the selected frequency component has a frequency that is closest to the target frequency of the coupling laser system 300. In some instances, the selected frequency component may have another comb frequency. For example, the selected frequency component on the selected output optical channel may have a frequency that is the second closest to the target frequency of the coupling laser system 300, the third closest to the target frequency of the coupling laser system 300, or another value. In some instances, the selected frequency component may be determined by the frequency-shifting capability of the frequency shifter 320 of the coupling laser system 300.

In some implementations, the frequency selector 316 includes a network of optical switches (e.g., a series of optical switches). In some implementations, the switch network in the frequency selector 316 is based on an optical switch (or plurality thereof). In some instances, the optical switch can be used to recombine the multiple frequency components of the frequency comb signal; and choose a particular frequency component. For example, the optical switch may be used to select a single frequency component (e.g., comb line). Such a selection can be made using drop-out filters that are based on MEMs, tunable Bragg gratings, and MEMs mirror systems, electro-optic, or photonic integrated circuits. These drop-out filters can be tuned thermally or piezoelectrically. Such selection may also be done using Fiber Bragg gratings, when tuned thermally or piezoelectrically. Electro-optic switches can provide fast (e.g., less than 10 ns) switching. In some implementations, optical switches that use drop-out filters based on photonic integrated circuits can be integrated across one or more chips (e.g., silicon dies). For example, the drop-out filters can be integrated with the comb generator 308 on one or more chips by using a Kerr-type frequency comb signal generated by a ring resonator. In this case, the optical switch of the frequency selector 316 and the dispersive element of the frequency disperser 312 may also be integrated as a single component. Other types of optical switches, or optical switch trees, can be used. For some applications, lower cost and slower optical switches, even shutters, may be suitable.

In some instances, a photonic integrated circuit (PIC) may be implemented in other subsystems of the example coupling laser system 300. For example, the photonic integrated circuit may define the comb generator 308, the frequency disperser 312, the frequency selector 316, or other parts of the example coupling laser system 300. For example, the frequency disperser 312 and the frequency selector 316 may be combined into a single unit; and the function of the frequency separator 311 may be achieved by a network of drop-out filters. In some instances, the network of drop-out filters may include multiple ring resonators that are associated with respective frequency components in the frequency comb signal 310. Each ring resonator is configured to resonate at a ring frequency when an optical path length of the ring resonator reaches a target optical path length. In certain instances, the optical path length may be altered, for instance, by straining the ring resonator via a piezoelectric element, by changing the temperature of the ring resonator via a heating element, or in another manner. Such processes can change one or both of a dimension and an index of refraction of the optical path length. The ring frequency of the ring resonator matches the frequency of a respective frequency components of the frequency comb signal 310. Thus, by selectively bringing certain ring resonators into and out of resonance, the photonic integrated circuit may allow the example coupling laser system 300 to select a desired frequency component.

In some instances, a photonic integrated circuit that can directly select a frequency component can provide certain advantages, such as improved stability and manufacturability. For example, the photonic integrated circuit may allow for an integrated package that reduces the number of connections between elements of the photonic integrated circuit and may also reduce the number of fiber optic cables needed for optical connections (e.g., external to the photonic integrated circuit). The photonic crystal circuit may also be amenable to mass production using processes adapted from large-scale semiconductor fabrication.

In some implementations, the frequency shifter 320 is configured to shift the selected frequency component toward the target output frequency. In some instances, the frequency shifter 320 may be configured to shift the selected frequency component 318 by fine-tuning the selected frequency component 318 to the target frequency, and/or by scanning the selected frequency component 318 about the target frequency. In some instances, the frequency shifter 320 may be configured to shift the selected frequency component 318 in another manner. In certain examples, the process of fine-tuning the selected frequency component 318 may include shifting the frequency of the selected frequency component 318 towards the target frequency along a single direction in frequency. In some examples, the process of scanning the selected frequency component 318 may include shifting the selected frequency component 318 back and forth through a frequency range that includes the target frequency. In some instances, the frequency range of the scanning process may be larger in magnitude than that associated with the fine-tuning process.

In certain instances, the frequency shifter 320 has a shifting capability that determines which comb frequencies are possible for the target separated frequency comb signal. The maximum value of the shifting capability may be based on the frequency range of the fine-tuning or scanning process. For example, the fine-tuning process may be associated with a frequency range that includes the target frequency of the coupling laser system 300. The comb frequencies of the frequency comb signal 310 may therefore include those also within the frequency range of the fine-tuning process. In some implementations, the frequency shifter 320 includes one or more optical modulators each of which is configured to perform a single sideband suppressed carrier (SSB-SC) modulation. In some examples, the frequencies of the frequency components in the frequency comb signal 310 are separated from each other by a common frequency spacing. In these variations, the frequency shifter 320 may be configured to shift the selected frequency components by a frequency magnitude no less than the common frequency spacing.

To fine tune the frequency of a selected frequency component 318 toward a target frequency, the frequency shifter 320 may include a Mach-Zehnder modulator. The spectral bandwidth of these modulators can be as high as 40 GHz, which in many instances allows them to fine-tune the location of the comb line by this amount. The process of fine tuning may be done by changing the modulator frequency, which can be a radio frequency. Fine tuning may then take the problem of re-locking the optical frequency and transfer it to generating the fine-tuning radio frequency. If the switching time is less than the time required to relock the radio frequency—e.g., the phase locked loop for the oscillator—then several different oscillators can be used for fine-tuning the output of the coupling laser system 300, such as with a rotating (e.g., pre-programmed) frequency for the fine-tuning. The number of oscillators required may be determined by, for example, the switching time, the oscillators phase locked loop, and the dwell time required at each frequency. The Mach-Zehnder modulators may, in certain instances, act as IQ modulators so that they are capable of shifting the frequency of the output using single sideband suppressed carrier (SSB-SC) modulation. In some instances, the SSB-SC modulation may eliminate unwanted frequencies from the frequency output by the coupling laser system 300. Improved suppression of unwanted frequencies can be achieved by using multiple Mach-Zehnder modulators (e.g., two Mach-Zehnder modulators in parallel).

As shown in FIG. 3, the probe laser system 300 communicates with a control system 322 which is electrically connected to the coupling laser 302, the laser stabilizer 306, the comb generator 308, the frequency separator 311 and the frequency shifter 320 to adjust parameters of the coupling laser system 300. In some instances, the control system 322 may be coupled to other components of the coupling laser system 322 to control other parameters. For example, the control system 322 can be configured to control the network of optical switches of the frequency selector 316 to select a target optical channel (e.g., of the arrayed waveguide grating) that carries the selected portion of the separated frequency comb signal. In some implementations, the control system 322 includes computation apparatus, a memory unit, an input/output interface, or other components that allow the communication of the control system 322 with other components of the coupling laser system 300, determine control parameter values of the components of the coupling laser system 300, and optimize the frequency comb signal 310 produced by the coupling laser system 300. In some instances, the control system 322 may be configured for performing other functions.

Figure 4:
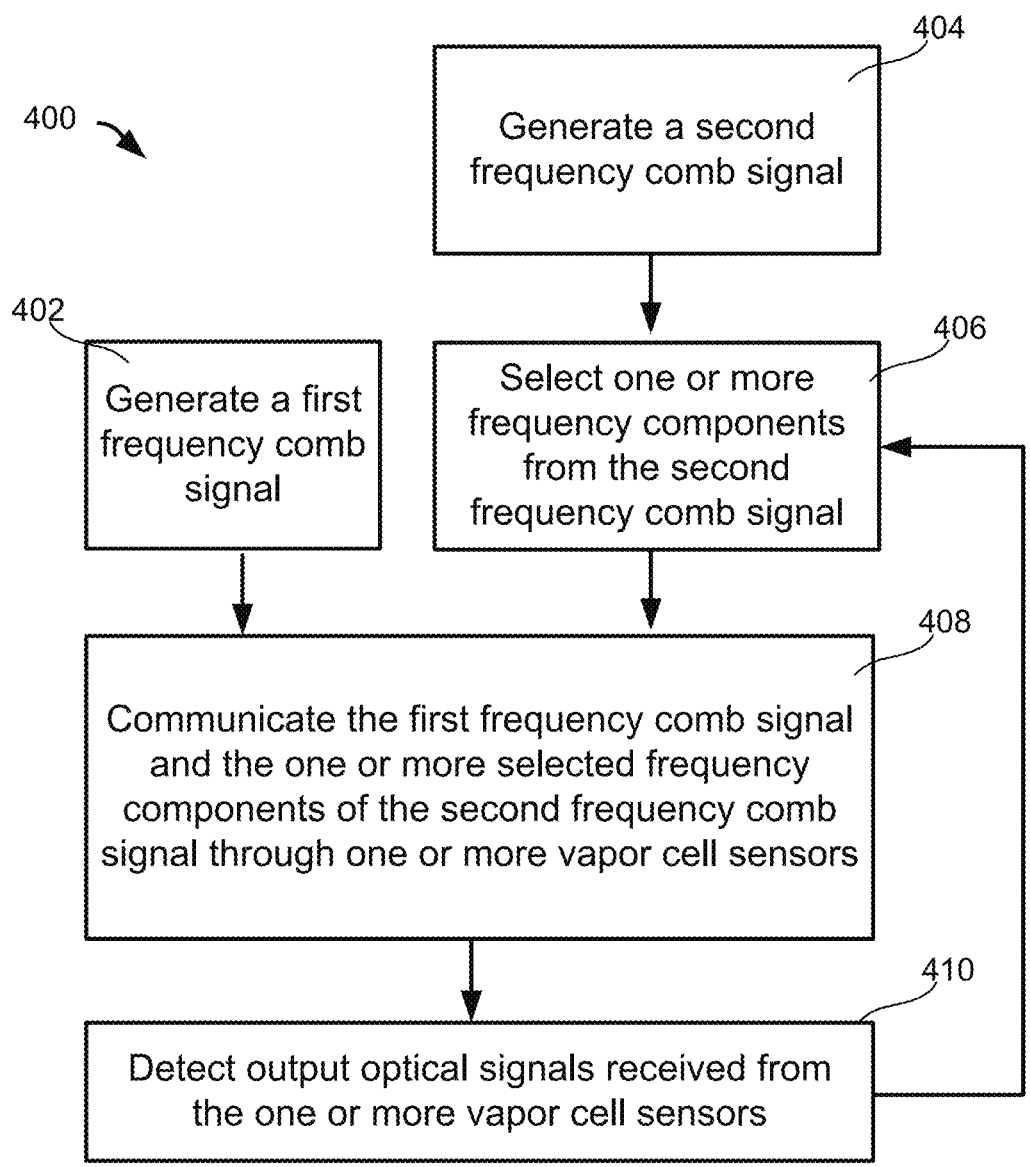
FIG. 4 is a flow chart showing aspects of an example process.

FIG. 4 is a flow chart showing aspects of an example process 400. The example process 400 can be used, for example, to operate the example QSS systems 100, 150, the example probe laser system 200, and the example coupling laser system 300 shown in FIGS. 1A-1B, 2A and 3. For instance, the example process 400 can be used to perform characterization of radio frequency signals from a wireless communication node of a wireless communication network (e.g., a cellular base station in a 4G-5G cellular communication network), electromagnetic radiation in an electronic warfare, or in another application. The example process 400 may include additional or different operations, including operations performed by additional or different components, and the operations may be performed in the order shown or in another order. In some implementations, one or more operations in the example process 400 can be performed by a computer system, for instance, by a digital computer system having one or more digital processors (e.g., data processing apparatus of the control system 120, 170, 220, 322) that execute instructions (e.g., instructions stored in the memory unit of the control system 120, 170, 220, 322).

At 402, a first frequency comb signal is generated. In some implementations, the first frequency comb signal is generated by operation of a probe laser system of the QSS system (e.g., the probe laser system 102, 152, 200 shown in FIGS. 1A-1B and 2A). During operation, a probe laser (e.g., the probe laser 112, 162, 212 shown in FIGS. 1A-1B and 2A) is configured to generate a direct probe laser output signal. The direct probe laser output signal is then communicated to a first comb generator (e.g., the comb generator 114, 164, 218 in FIGS. 1A-1B and 2A), where the first frequency comb signal is generated based on the probe laser signal. The first frequency comb signal includes a first set of frequency components with respective first frequencies. In some implementations, the first comb generator includes a first electro-optic modulator.

At 404, a second frequency comb signal is generated. In some implementations, the second frequency comb signal is generated by operation of a coupling laser of the QSS system (e.g., the coupling laser system 104, 154, 300 shown in FIGS. 1A-1B and 3). During operation, a coupling laser (e.g., the coupling laser 122, 172, 302 shown in FIGS. 1A-1B and 3) is configured to generate a direct coupling laser output signal. The direct coupling laser output signal is then communicated to a second comb generator where the second frequency comb signal is generated based on the coupling laser signal. The second frequency comb signal includes a second set of frequency components with respective second frequencies. In some implementations, the second comb generator includes a second electro-optic modulator.

At 406, one or more frequency components of the second frequency comb signal are selected. In some implementations, the one or more frequency components of the second frequency comb signal can be selected by operation of a frequency separator (e.g., the frequency separator 130, 180, 311 shown in FIGS. 1A-1B and 3). The selected frequency components from the second set may be processed (e.g., amplified by operation of the second amplifiers 182 in FIG. 1B, shifted by operation of one or more frequency shifters 184, 320 in FIGS. 1B and 3, or in another manner). In some implementations, the frequency separator includes an arranged waveguide grating.

In some implementations, the coupling laser system generates, by operation of the second comb generator, the second frequency comb signal having multiple frequency components at respective comb frequencies. In some instances, the coupling laser is stabilized to an absolute frequency reference and amplified. The direct coupling laser output signal can be doubled by operation of a frequency doubler to produce light around the necessary coupling laser wavelength. The direct coupling laser output signal may be amplified. The amplified direct coupling laser output signal is used to produce the second frequency comb signal with spacings of ~20 GHz that spans the range of coupling laser wavelengths required to sense the electromagnetic radiation with a broad frequency range, e.g., ~100 GHz. Typically, the second frequency comb signal can include 40-80 comb lines. The coupling laser system also spatially separates, by operation of a frequency disperser (e.g., the frequency disperser 312 in FIG. 3), the second frequency comb signal onto respective optical channels of the frequency disperser. A frequency component may be selected from the separated frequency comb signals by operation of the frequency selector. The frequency of the selected frequency component can be electro-optically shifted by operation of a frequency shifter (e.g., the frequency shifter 320 in FIG. 3) to the Rydberg transition resonance. After being shifted to the resonance, the one or more selected frequency components of the second frequency comb signal may be further amplified. In some instances, the example coupling laser system includes one or more amplifiers that amplify the direct coupling laser output signal, the one or more selected frequency components, or optical signals at any intermediate stages of the coupling laser system.

In some implementations, the process of fine tuning or frequency shifting is accomplished at radio frequency. For instance, the tuning time for the example coupling laser system may be determined by relocking the radio frequency oscillator that drives the fine-tuning electro-optic modulator (e.g., the phase locked loop in the radio frequency source). Multiple sources for the fine tuning can be used to alleviate the relock time of the phase locked loop in the radio frequency source. The hopping time among different target frequencies can be reduced, often significantly, since the coupling laser does not need to be unlocked and relocked when different frequencies are chosen. This reduction can occur while maintaining a narrow spectral bandwidth. The spectral bandwidth may, in some instances, be limited by the dwell time and the time before a measurement at any frequency. For example, the spectral bandwidth may be limited by a time-bandwidth product. Here, the time-bandwidth product is defined by $\Delta v \cdot \Delta t$, where $\Delta v$ is the bandwidth in the frequency domain and $\Delta t$ is the bandwidth in the time domain (e.g., a pulse width). Fourier theory says that the magnitude of this product can be 0.44 for a transform-limited Gaussian pulse. However, depending on the pulse type, other magnitudes are possible.

At 408, the first frequency comb signal from the probe laser system and the one or more selected frequency components of the second frequency comb signal from the coupling laser system are communicated through a vapor cell sensor. The vapor cell sensor (e.g., the vapor cell sensor 106, 156 shown in FIGS. 1A-1B) is configured to receive input optical signals based on the first frequency comb signal and the one or more selected frequency components of the second frequency comb signal; and produce output optical signals based on interactions of the vapor and the input optical signals. In some instances, the one or more selected frequency components of the second frequency comb signal include one or more selected frequency components shifted by operation of the frequency shifter toward one or more Rydberg states of the vapor in the vapor cell sensor. In some implementations, the one or more vapor cell sensors are configured to sense one or more respective frequencies of electromagnetic radiation. In some implementations, the one or more vapor cell sensors are arranged as an array of vapor cell sensors; and the array has a topology that is reconfigurable according to different applications.

At 410, the output optical signals from the vapor cell sensors are detected. In some implementations, the output optical signals are received by one or more optical detectors. In some instances, the reference optical signal from the frequency reference can be transmitted to the same optical detector or different optical detectors configured to only receive the frequency reference. In some instances, the output optical signals from the vapor cell sensor are combined with the reference optical signal from a frequency reference (e.g., the frequency reference 166 in FIG. 1B) to form a beat signal. Each optical detector can generate analog electrical signals in response to the output optical signals detected. The analog electrical signals can then be communicated to a signal processing system (e.g., the signal processing system 110, 160 in FIGS. 1A-1B), where they can be amplified, digitized, and processed. In some implementations, the output optical signals are based on interactions of the vapor with the input optical signals in the presence of electromagnetic radiation from outside the vapor cell sensor. The signal processing system communicably coupled to the optical detector is configured to generate data representing properties of the output optical signals at one or more comb frequencies of the first frequency comb signal; and determine one or more properties of the electromagnetic radiation based on the data.

In some instances, multiple optical detectors can be used if several sets of comb lines from the first and second frequency comb signals can be directed through the same or multiple vapor cells. Each optical detector can be configured to sense changes in the transmission through the vapor cell sensor due to the interaction of electromagnetic radiation. The analog signal generated by the optical detector is converted to a digital signal that can be processed by a signal processing system which may include a FPGA, GPU, computer processor, or some combination thereof, including specialized hybrid processors. In some instances, the signal processing system is configured to store the digital signal as a function of time, geolocations, and running it through multiple matched filters to identify the periodicity, arrival time, and various other properties of incoming, time dependent RF signals. In some instances, the operations in the example process 400 can be performed, by operation of a QSS system, to detect continuous wave signals. The continuous wave signals can be averaged together over time or acquired in real-time. The signal train can be subjected to Fourier transform analysis in the FPGA or processing unit. The data is used to locate and measure incoming signals that vary in time and space and calculate derivative information based on the measurements, such as angle of arrival of a signal using multiple sensors. The data is available in whole or in part to the user via the user interface. The digital signals can be stored in a memory unit of the signal processing system for future evaluation in whole or in part. In some instances, the control system may include a communication module; and multiple QSS systems can be linked together fiber optically, by wired communications, or wireless communications, for example.

In some instances, the performance of the example QSS system may be improved by subtracting a background optical spectrum from the optical spectrum. For example, the example QSS system may generate a background optical spectrum by interacting with the first frequency comb signal with the vapor in the absence of the frequency component of the second frequency comb signal. The background optical spectrum represents, at least in part, a background optical transmission of the vapor at the comb frequencies of the first frequency comb signal. The example system also detects a property of the background optical spectrum at the one or more comb frequencies (e.g., a subset of comb frequencies, all comb frequencies, etc.). The property may be an amplitude of the background optical spectrum, a polarization of the background optical spectrum, a phase of the background optical spectrum, or a combination thereof. Other properties are possible. The signal processing system may then generate first and second data. The first data represents the optical property of the optical spectrum at the one or more comb frequencies. Similarly, the second data represents the optical property of the background optical spectrum at the one or more comb frequencies. Using a difference between the first and second data, and when the electromagnetic radiation is being received by the vapor cell sensor, the signal processing system can determine an amplitude of the electromagnetic radiation, a phase of the electromagnetic radiation, a polarization of the electromagnetic radiation, or other properties of the electromagnetic radiation.

In pulsed detection mode, it can be useful to know the absolute amplitude of the pulse of electromagnetic radiation. If the pulse splits the transmission peak, the output optical signals received by an optical detector may saturate the optical detector; and the pulse amplitude is unknown. By measuring with the first frequency comb signal, the Autler-Townes peak splitting can be measured; and the pulse amplitude can be determined. In the amplitude regime, measuring the entire peak may also help to determine the amplitude of the pulse because the change in peak height can be fit to models, leading to a better determination of the pulse amplitude. The example QSS system can open opportunities to use pulse amplitude detection in radar for applications like decluttering.

Figure 5:
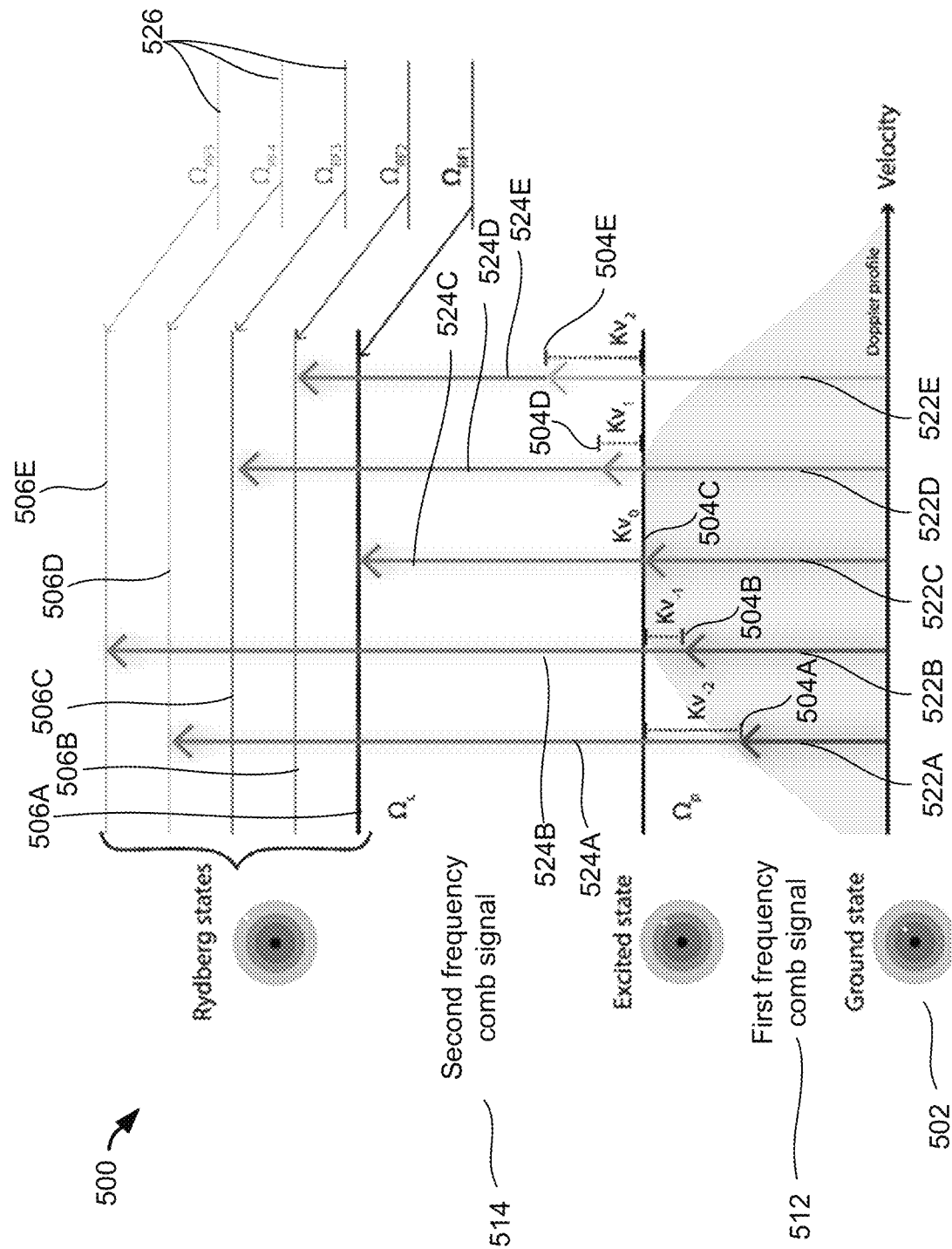
FIG. 5 is a schematic diagram showing multiple RF Fields.

FIG. 5 is an energy diagram 500 depicting a process of simultaneous measurement of multiple on-resonance RF signals. As shown in FIG. 5, frequency components 522A, 522B, 522C, 522D, 522E of a first frequency comb signal 512 are used to excite respective groups of atoms in the vapor from the ground state 502 to an excited state 504. The frequency components 522A, 522B, 522D, 522E are selected from the first frequency comb signal 512 such that they are detuned from the Doppler-free resonance, e.g., the difference in energy levels between the ground state and the Doppler-free excited state 504C. In other words, the respective groups of atoms that have a non-zero velocity component along the direction of the laser light, are excited from the ground state to excited states different from the Doppler-free excited state, by the respective selected frequency components. In particular, a first group of atoms are excited by the frequency component 522A from the ground state 502 to a first excited state 504A that has a detuning of $Kv_{-2}$ from the Doppler-free excited state 504C; a second group of atoms are excited by the frequency component 522B from the ground state 502 to a second excited state 504B that has a detuning of $Kv_{-1}$ from the Doppler-free excited state 504C; a third group of atoms are excited by the frequency component 522C from the ground state 502 to a third excited state 504C that has a detuning of $Kv_0$ from the Doppler-free excited state 504C; a fourth group of atoms are excited by the frequency component 522D from the ground state 502 to a fourth excited state 504D that has a detuning of $Kv_1$ from the Doppler-free excited state 504C; and a fifth group of atoms are excited by the frequency component 522E from the ground state 502 to a fifth excited state 504E that has a detuning of $Kv_2$ from the Doppler-free excited state 504C. In some implementations, the frequency components are selected according to the velocity distribution of the atoms, e.g., the Doppler profile. The frequency component 522C is configured to excite the atoms at the center of the Doppler profile (e.g., having zero velocity component along the direction of the laser light, e.g., the frequency component 522C is on resonance. In some instances, the frequency components of the first frequency comb signal are selected in another manner. For example, the frequency components of the first frequency comb signal may not be selected symmetric along the center of the Doppler profile as shown in FIG. 5; and the number of frequency components of the first frequency comb signal may be different from the one shown in FIG. 5.

As shown in FIG. 5, frequency components 524A, 524B, 524C, 524D, 524E are selected from a second frequency comb signal 514 such that a pair of frequency components 522, 524 can be used to excite a respective pair of atoms from the ground state 502 from a respective Rydberg state 506 via a respective excited state 504. In particular, the frequency components 522C, 524C are selected to excite a first group of atoms from the ground state to a first Rydberg state 506A; the frequency components 522E, 524E are selected to excite a second group of atoms from the ground state to a second Rydberg state 506B; the frequency components 522D, 524D are selected to excite a third group of atoms from the ground state to a third Rydberg state 506C; the frequency components 522A, 524A are selected to excite a fourth group of atoms from the ground state to a fourth Rydberg state 506D; and the frequency components 522B, 524B are selected to excite a fifth group of atoms from the ground state to a fifth Rydberg state 506E.

In some implementations, optical heterodyning is used to read out selected frequency components 522A, 522B, 522C, 522D, 522E of the first frequency comb signal 512. Each group of atoms within the same velocity range is associated with a different RF frequency. In certain instances, the numbers of channels can be determined according to the width of the Doppler profile; and multiple RF signals at different RF frequencies can be sensed simultaneously. For example, within a 1-GHz Doppler profile, and a 15 MHz channel bandwidth, the number of channels can be determined by 1 GHz/15 MHz, which is about 67 channels, yielding an overall bandwidth of 133 MHz (e.g., 67 channels×2 MHz).

In some implementations, the first frequency comb signal 512, the second frequency comb signal 514, the frequency components selected from the first frequency comb signal 512, the frequency components selected from the second frequency comb signal 514 can be generated by operation of the example portable QSS system 100, 150, the respective laser systems 200, 300 in FIGS. 1A-1B, 2A and 3, by performing operations in the example process 400.

Figure 6:
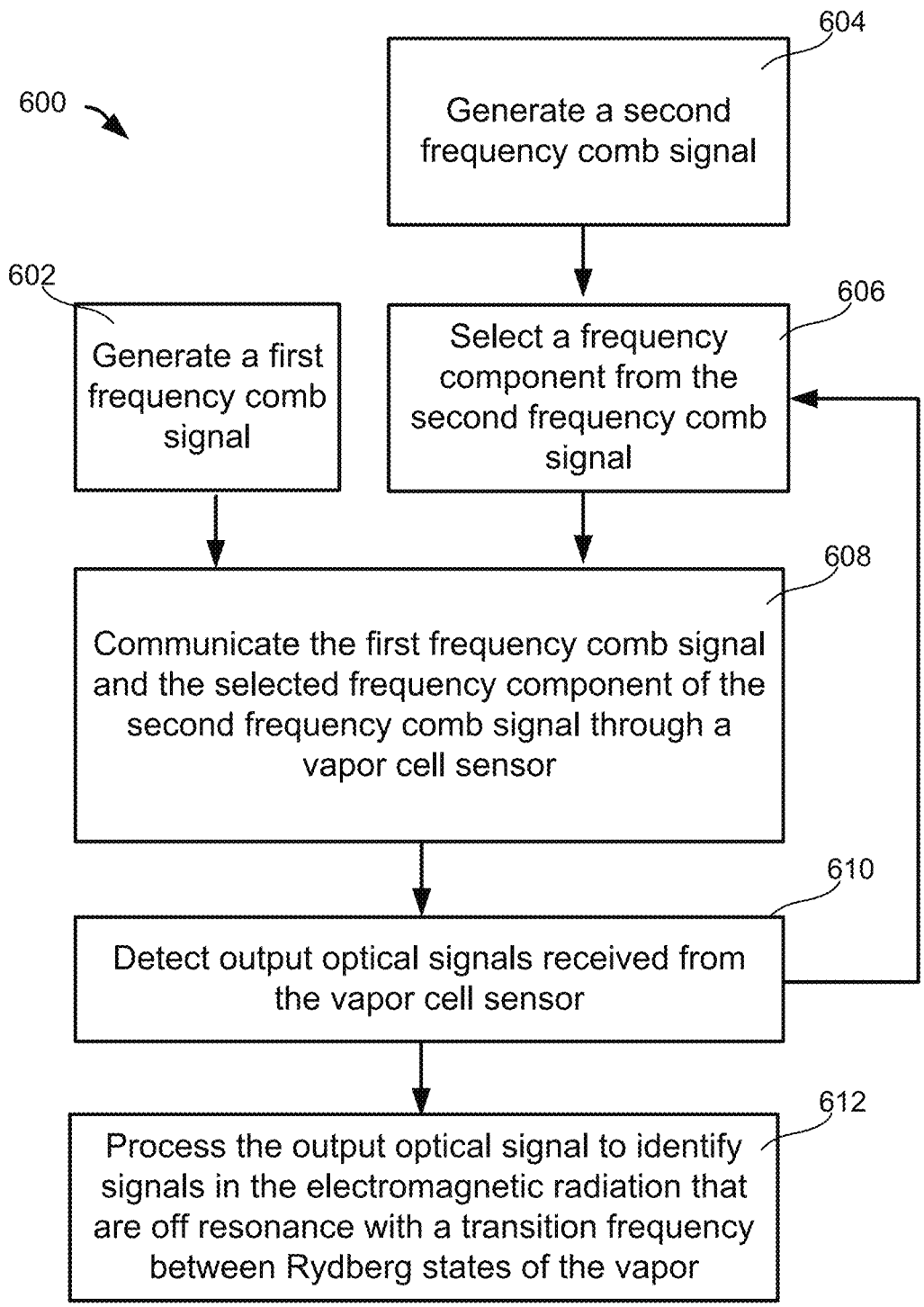
FIG. 6 is a flow chart showing aspects of an example process.

FIG. 6 is a flow chart showing aspects of an example process 600. The example process 600 can be used, for example, to operate the example QSS systems 100, 150, the example probe laser system 200, and the example coupling laser system 300 shown in FIGS. 1A-1B, 2A and 3. For instance, the example process 600 can be used to perform characterization of radio frequency signals from a wireless communication node of a wireless communication network (e.g., a cellular base station in a 4G-5G cellular communication network), electromagnetic radiation in an electronic warfare, or in another application. The example process 600 may include additional or different operations, including operations performed by additional or different components, and the operations may be performed in the order shown or in another order. In some implementations, one or more operations in the example process 600 can be performed by a computer system, for instance, by a digital computer system having one or more digital processors (e.g., data processing apparatus of the control system 120, 170, 220, 322) that execute instructions (e.g., instructions stored in the memory unit of the control system 120, 170, 220, 322).

At 602, a first frequency comb signal is generated. In some implementations, the first frequency comb signal including one or more frequency components can be generated by operation of the probe laser system 102, 152, 200. In some instances, the one or more frequency components of the first frequency comb signal can be detuned from the excited state for stationary atoms, for example, during an off-resonance measurement. For example, one or more frequency components of the first frequency comb signal can be on resonance or detuned from resonance. In some instances, detuning can be introduced into the one or more frequency components by introducing an offset in the first frequency comb generator. In certain examples, the probe laser system may include a frequency shifter. In this case, shifting the frequency components of the first frequency comb signal can be performed by operation of one or more fine-tune elements in the frequency shifter of the probe laser system.

At 604, a second frequency comb signal is generated; and at 606, a frequency component of the second frequency comb signal is selected according to a first Rydberg state. In some implementations, the second frequency comb signal including one or more frequency components can be generated by operation of the coupling laser system 104, 154, 300. In some instances, the frequency component of the second frequency comb signal can be selected to detect a certain bandwidth (e.g., 250 MHz) centered on a chosen RF frequency. In some implementations, the frequency component selected from the second frequency comb signal can then be fine-tuned toward the first Rydberg state (e.g., on resonance or near resonance. This allows a real-time spectrum analysis by interrogating the transmission of each frequency component in the first frequency comb signal using a heterodyne read-out.

At 608, the first frequency comb signal from the probe laser system and the selected frequency component of the second frequency comb signal from the coupling laser system are communicated through a vapor cell sensor; at 610, the output optical signals from the vapor cell sensors are detected. The operations 602, 604, 606, 608, 610 may be implemented as the corresponding operations in the example process 400 shown in FIG. 4.

At 612, the output optical signal is processed to identify signals in the electromagnetic radiation that are off resonance with a transition frequency between the first Rydberg state and a second Rydberg state of the vapor. In some implementations, the heterodyned probe laser transmission passing through the vapor cell sensor is recorded and digitized. A transformation is performed on the digitized signal to convert the data in the time domain to a spectrum in the frequency domain. For example, the data can be readout directly into an FPGA which can do a real-time fast Fourier transform (FFT) of the heterodyne signal to acquire the spectrum which can be as broad as the Doppler width of the atomic transition.

In some implementations, properties of the output optical signals are characterized. In some instances, off-resonant RF fields can be identified by observing EIT/EIA signals at different values of the detuning values of the first frequency comb signal. In some instances, time-dependent measurements can be performed by selecting different probe laser comb frequencies using filtering in the FPGA and recording the time-dependent response. In some instances, other types of signal processing can be performed once the output optical signals are acquired.

Figure 7:
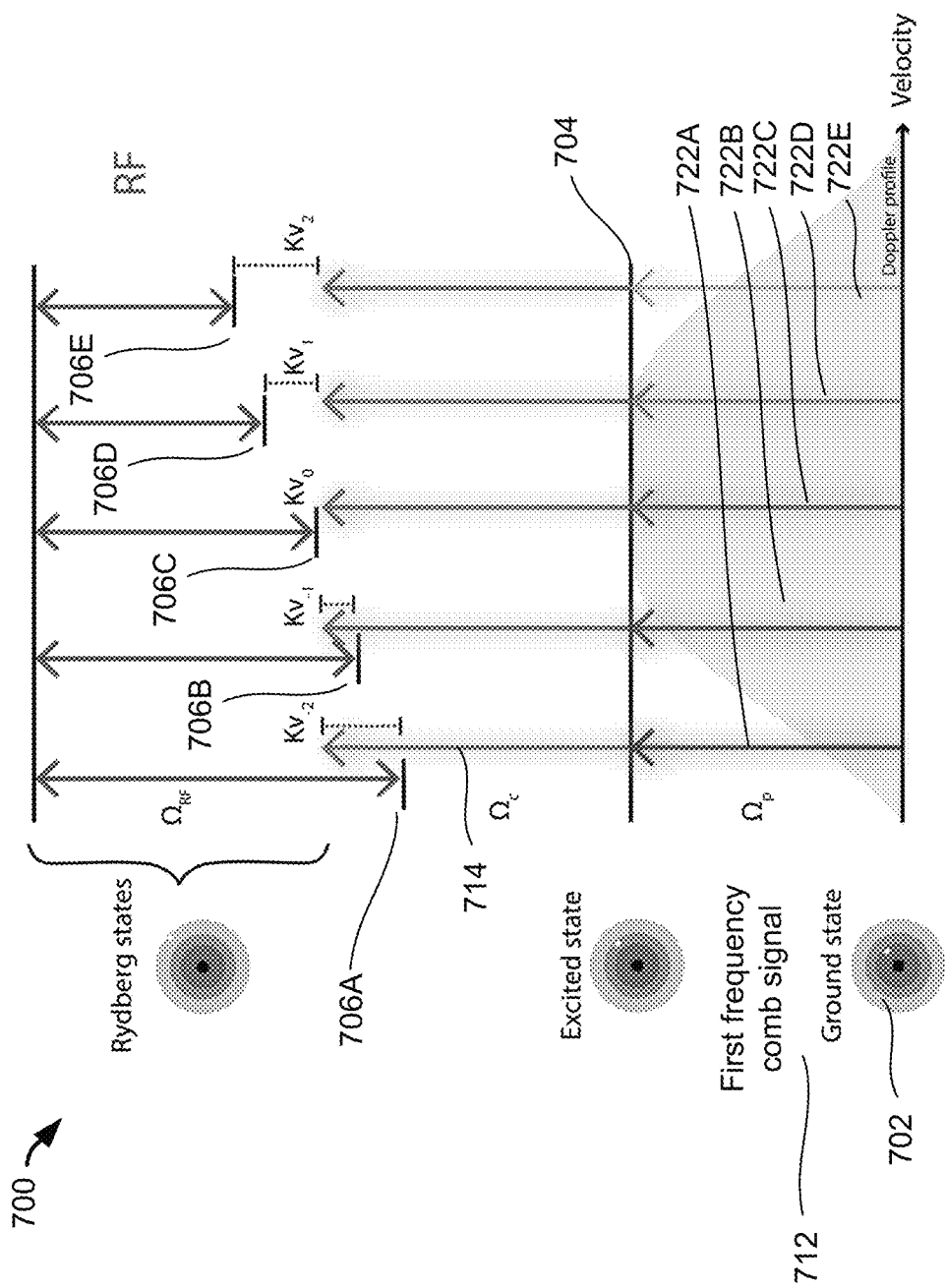
FIG. 7 is a schematic diagram showing multiple RF Fields.

In some cases, for an optimum configuration of the spectrum analyzer, the off-resonant sensing is accomplished by using the first frequency comb signal generated by the probe laser system. The first frequency comb signal from the probe laser system interacts with the atoms in the vapor cell sensor whose Doppler shift puts them on resonance with a particular tooth of the first frequency comb signal. The frequency components can be selected from the second frequency comb signal to resonance and produces off-resonant EIT/EIA spectrum. The EIT/EIA spectrum is formed by the first frequency comb signal, the selected frequency component of the second frequency comb signal, and the electromagnetic radiation received from outside of the vapor cell sensor, with the intermediate Rydberg state adiabatically eliminated by the frequency detuning of the electromagnetic radiation, as shown in FIG. 7. The properties of the off-resonance peaks (e.g., the off-resonance peak 814 in the example EIT/EIA spectrum 800 shown in FIG. 8A), including amplitude, frequency, phase or phase change, or other properties can be used to determine the properties of the electromagnetic radiation and/or its presence for spectrum monitoring. Since the signal falls off as the ratio of the coupling laser Rabi frequency to the detuning of the electromagnetic radiation from the Rydberg resonance, it is important to have a large coupling laser Rabi frequency. In the example shown in FIG. 7, the coupling laser Rabi frequency is 25 MHz. The electromagnetic radiation falls off by around a factor of 5 for an overall bandwidth of 250 MHz.

In some instances, the operations in the example process 600 may be repeated. For example, operations of the example process 600 to operate a vapor cell sensor can be repeated during distinct time periods to detect the condition of the cellular base station in a cellular communication network during each of the distinct time periods. For another example, the operations of the example process 600 can be performed by moving the vapor cell sensor to a different measurement geolocation for characterizing the radio frequency signal emitted by a distinct cellular base station. For another example, after the real time spectrum is acquired for a bandwidth of ~250 MHz, a second, different frequency component may be selected from the second frequency comb signal and further fine-tuned towards a third Rydberg state to obtain the next 250 MHz section of the overall spectra. In some instances, the control system is in communication with the frequency selector and is operable to determine a difference between the target frequency of the coupling laser system and an updated target frequency of the example coupling laser system. In these variations, the control system is also operable to transmit a control signal to the frequency selector (e.g., control a network of optical switches) to generate a second selected frequency component. The control signal is based on the difference determined by the control system, and the second selected frequency component is generated based on the control signal. In many variations, the second selected frequency component may have a frequency that is different than that of the (first) selected frequency component. For example, the frequency of the second selected frequency component may be closer to the updated target frequency than that of the (first) selected frequency component.

In some instances, the frequency components from the second frequency comb signal are stepped through a series of Rydberg states to stitch together the overall spectrum (e.g., 100 GHz or another range of spectrum). In some instances, the spectrum does not have to be constructed in a continuous manner and all regions of the spectrum do not have to be acquired. In some instances, the QSS system may be focused on specific spectral regions. In some instances, the frequency component of the second frequency comb signal can be switched in <1 μs to a different Rydberg state. By combining the real-time spectrum acquisition around each Rydberg state, continuous spectra can be obtained.

FIG. 7 is a schematic diagram 700 showing aspects of an example process of measurement of electromagnetic radiation that are off resonance with a transition frequency of two Rydberg states. As shown in FIG. 7, frequency components 722A, 722B, 722C, 722D, 722E of a first frequency comb signal 612 are used to excite respective groups of atoms in the vapor from the ground state 602 to the Doppler-free excited state 704. The frequency components of the first frequency comb signal are resonant with respective group of atoms distinguished by their velocity, e.g., atomic velocity groups. The frequency components 722A, 722B, 722D, 722E are selected from the first frequency comb signal 712 and compensated to counteract the average Doppler shifts associated with the respective groups of atoms. In some implementations, the Doppler profile of the atoms is obtained; and can be used to sense RF frequencies across the Doppler distribution of the atoms in the vapor cell sensor.

In some implementations, a single frequency coupling laser is applied to excite the different groups of atoms from the excited state to a first Rydberg state 706C. In some instances, a frequency component of a second frequency comb signal can be selected and used to excite the different groups of atoms from the excited state 704 to the first Rydberg state 706C. EIT/EIA experiments with RF signals whose detuning values match the Doppler shifts can be performed. In some instances, the single frequency coupling laser or the selected frequency component can be detuned toward the first Rydberg state 706C; and the EIT/EIA experiments can be repeated performed to detect RF signals at different frequencies with different detuning. In some instances, the Doppler shifts and the first frequency comb signal can enable a spectrum of RF frequencies to be measured around a Rydberg state RF resonance. In some instances, the method described here can be used to perform broad bandwidth signal acquisition around a Rydberg state RF resonance. In some instances, the methods and techniques described here can be used to detect unknown RF signals by scanning a broad range of frequencies.

In some implementations, the first frequency comb signal 712, the frequency components 722A, 722B, 722C, 722D, 722E selected from the first frequency comb signal 712, the selected frequency component of the second frequency comb signal 714, can be generated by operation of the example portable QSS system 100, 150, the respective laser systems 200, 300 in FIGS. 1A-1B, 2A and 3, by performing operations in the example process 400.

Figure 8A:
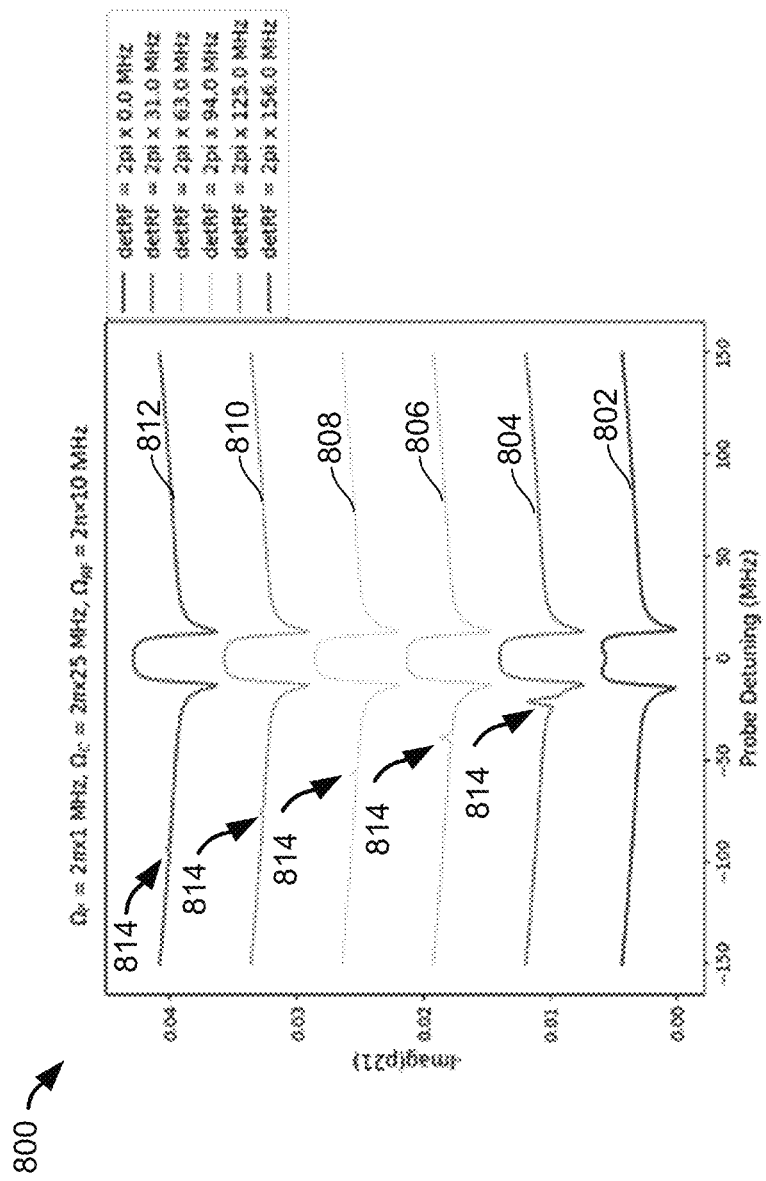
FIG. 8A is a plot showing an example of $\Delta$ ($\rho 21$) as a function of the probe detuning value in units of MHz at various RF detuning values.
Figure 8B:
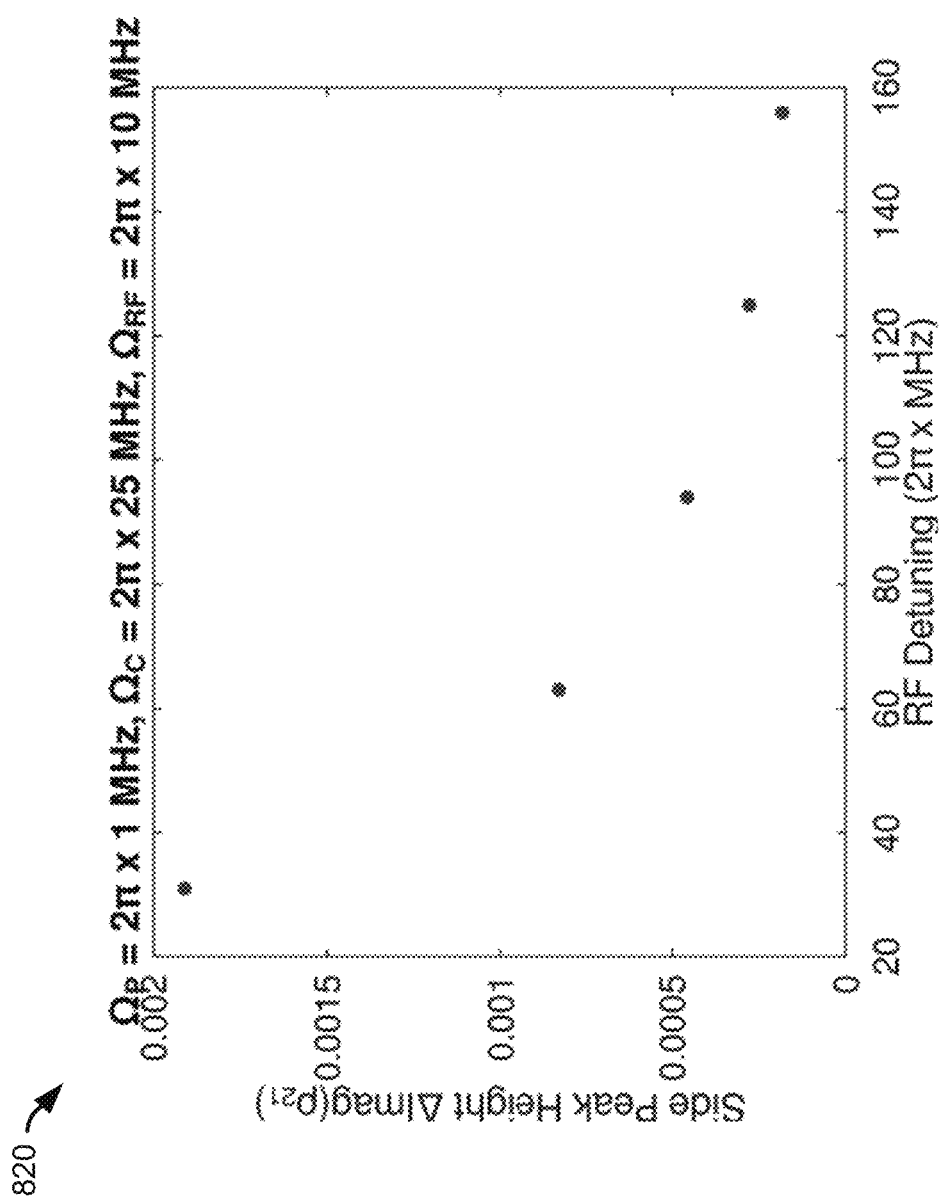
FIG. 8B is a plot showing EIT signal peak height in $\Delta$ ($\rho 21$) (from the example shown in FIG. 8A) as a function of RF detuning values in units of $2\pi$ MHz.

FIG. 8A is an off-resonant probe laser EIT spectrum 800 showing Δ (ρ21) as a function of detuning of the frequency components of the first frequency comb signal in MHz at various RF detunings. With reference to FIGS. 8A and 8B, the RF detuning refers to the difference between the frequency of the electromagnetic radiation experienced by the vapor in the vapor cell and the transition frequency between Rydberg states of the vapor. As shown in FIG. 8A, EIT signals 814, represented by small peaks (e.g., off-resonance peaks) at negative probe detuning values, can be observed. As the RF detuning from resonance increases (curve 802 represents an RF detuning value of $2\pi \times 0$ MHz; curve 804 represents an RF detuning value of $2\pi \times 31$ MHz; curve 806 represents an RF detuning value of $2\pi \times 63$ MHz; curve 808 represents an RF detuning value of $2\pi \times 94$ MHz; curve 810 represents an RF detuning value of $2\pi \times 125$ MHz; and curve 812 represents an RF detuning value of $2\pi \times 156$ MHz), the position, the amplitude, the phase or phase change of the off-resonance peaks vary. In particular, the frequency of the EIT signal (e.g., EIT peak position) shifts to more negative probe detuning values; and at the same time, the amplitude of the EIT signal (e.g., EIT peak height) is reduced.

FIG. 8B is a plot 820 showing EIT peak height (Δ (ρ21)) as a function of RF detuning in $2\pi \times$ MHz. As shown in FIG. 8B, the EIT peak height or the EIT signal strength reduces as the RF detuning increases from resonance. The laser parameters used are shown in FIG. 8B. These parameters are the frequency component of the first frequency comb signal from the probe laser is $\Omega_p = 2\pi \times 1$ MHz, frequency component of the second frequency comb signal from the coupling laser is $\Omega_c = 2\pi \times 25$ MHz, and the resonance frequency of the RF field is $\Omega_{RF} = 2\pi \times 10$ MHz.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

In a general aspect, detecting off-resonance signals in a vapor cell sensor is described.

In a first example, a system includes a laser system, a vapor cell sensor, and an optical detector. The laser system includes a first laser configured to generate a first laser signal; a first comb generator configured to output a first frequency comb signal based on the first laser signal; a second laser configured to generate a second laser signal; a second comb generator configured to generate a second frequency comb signal based on the second laser signal; a frequency separator communicably coupled to the second comb generator and configured to select one or more frequency components of the second frequency comb signal; and one or more frequency shifters configured to shift the one or more selected frequency components toward one or more Rydberg states of a vapor. The vapor cell sensor includes the vapor and is configured to receive input optical signals based on the first frequency comb signal and the one or more shifted frequency components of the second frequency comb signal; and produce output optical signals based on interactions of the vapor with the input optical signals. The optical detector is configured to detect the output optical signals.

Implementations of the first example may include one or more of the following features. The system includes one or more amplifiers configured to receive the one or more selected frequency components from the frequency separator; and amplify the one or more selected frequency components of the second frequency comb signal. Each of the one or more frequency shifters includes an optical modulator that performs single sideband suppressed carrier (SSB-SC) modulation. The frequency separator includes an arrayed waveguide grating.

Implementations of the first example may include one or more of the following features. The frequency separator includes a frequency disperser configured to spatially separate frequency components of the second frequency comb signal; and a frequency selector configured to select the one or more frequency components from the spatially separated frequency components. The frequency selector includes drop-out filters defined by a photonic integrated circuit. The frequency selector includes optical switches defined by a photonic integrated circuit. The system includes a plurality of vapor cell sensors each configured to receive input optical signals based on the first frequency comb signal and the second frequency comb signal; and produce output optical signals based on the input optical signals, wherein the optical switches are configured to route distinct frequency components of the second frequency comb signal to distinct vapor cell sensors of the plurality of vapor cell sensors.

Implementations of the first example may include one or more of the following features. The optical detector is a first optical detector configured to detect the output optical signals, and the system includes a frequency reference configured to generate a reference optical signal, and a second optical detector configured to detect the reference optical signal. The first comb generator includes a first electro-optic modulator; and the second comb generator includes a second electro-optic modulator. The first frequency comb signal has a first frequency component with a first comb frequency matched to a first optical electronic transition of the vapor; the one or more selected frequency components of the second frequency comb signal includes a second frequency component with a second comb frequency matched to a second optical electronic transition of the vapor, the second optical electronic transition sharing an energy level in common with the first optical electronic transition; and the vapor defines an RF electronic transition configured to alter, in response to absorbing electromagnetic radiation, an absorption of light by one or both the first and second optical electronic transitions.

Implementations of the first example may include one or more of the following features. The laser system includes an acousto-optic modulator configured to receive the first laser signal from the first laser; and split the first laser signal into first and second portions, the second portion having a frequency different from that of the first portion; and the first comb generator is configured to receive the first portion of the first laser signal from the acousto-optic modulator; and generate the first frequency comb signal based on the first portion of the first laser signal.

Implementations of the first example may include one or more of the following features. The output optical signals are based on interactions of the vapor with the input optical signals in the presence of electromagnetic radiation from outside the vapor cell sensor, and the system includes a signal processing system communicably coupled to the optical detector and configured to generate data representing properties of the output optical signals at one or more comb frequencies of the first frequency comb signal; and determine one or more properties of the electromagnetic radiation based on the data. The frequency separator is configured to select, from the second frequency comb signal, a first frequency component associated with a first Rydberg state of the vapor; the one or more frequency shifters are configured to receive the selected first frequency component from the frequency separator; and tune the selected first frequency component toward the first Rydberg state of the vapor, wherein the input optical signals are based on the first frequency comb signal and the tuned first frequency component; and the signal processing system is configured to process the output optical signals to identify one or more properties of the electromagnetic radiation that are off resonance with a transition frequency of the first Rydberg state and a second Rydberg state. Processing the output optical signals to identify signals in the electromagnetic radiation that are off resonance with a transition frequency includes digitizing the detected output optical signal from the optical detector; performing a transformation of the digitized output optical signal; and identifying off-resonance peaks in the transformed output optical signal as a function of a frequency detuning of the selected first frequency components. The transformation of the digitized output optical signal is a wavelet transformation. The transformation of the digitized output optical signal is a Fourier transformation.

Implementations of the first example may include one or more of the following features. The system includes a clock configured to provide timing data associated with the properties of the electromagnetic radiation; and a location detection system configured to provide geolocation data associated with the properties of the electromagnetic radiation. The system includes a plurality of vapor cell sensors each configured to receive input optical signals based on the first frequency comb signal and the second frequency comb signal; and produce output optical signals based on the input optical signals received by the vapor cell sensor, wherein the plurality of vapor cell sensors are configured to sense a plurality of frequencies of electromagnetic radiation. The plurality of vapor cell sensors are spatially arranged as an array of vapor cell sensors, and the array has a topology that is reconfigurable. The vapor cell sensor is configured to receive radio frequency signals from a wireless communication node of a wireless communication network, and the system includes a signal processing system communicably coupled to the optical detector and configured to analyze data based on the detected output optical signals, and the analysis includes characterizing the radio frequency signals from the wireless communication node.

In a second example, a method includes generating, by operation of a first comb generator, a first frequency comb signal based on a first laser signal received from a first laser; generating, by operation of a second comb generator, a second frequency comb signal based on a second laser signal received from a second laser; selecting, by operation of a frequency separator, one or more frequency components from the second frequency comb signal; shifting, by operation of a frequency shifter, the one or more selected frequency components toward one or more Rydberg states of a vapor; receiving, at a vapor cell sensor comprising the vapor, input optical signals based on the first frequency comb signal and the shifted one or more selected frequency components of the second frequency comb signal through; and detecting, by operation of an optical detector, output optical signals from the vapor cell sensor, the output optical signals generated based on interactions of the vapor and the input optical signals.

Implementations of the second example may include one or more of the following features. The method includes receiving, at one or more amplifiers, the one or more selected frequency components from the frequency separator; and amplifying, by operation of the one or more amplifiers, the one or more selected frequency components of the second frequency comb signal. Each of the one or more frequency shifters includes an optical modulator that performs single sideband suppressed carrier (SSB-SC) modulation. The frequency separator includes a frequency disperser and a frequency selector, and selecting the one or more frequency components from the second frequency comb signal includes spatially separating, by operation of the frequency disperser, frequency components of the second frequency comb signal; and selecting, by operation of the frequency selector, the one or more frequency components from the spatially separated frequency components.

Implementations of the second example may include one or more of the following features. The method includes routing distinct frequency components of the second frequency comb signal to distinct vapor cell sensors of a plurality of vapor cell sensors. The optical detector is a first optical detector, and the method includes generating, by operation of a frequency reference, a reference optical signal; and detecting the reference optical signal at a second optical detector. Generating the first frequency comb signal based on the first laser signal includes receiving, at an acousto-optic modulator, the first laser signal from the first laser; splitting, by operation of the acousto-optic modulator, the first laser signal into first and second portions, the second portion having a frequency different from that of the first portion; receiving, at the first comb generator, the first portion of the first laser signal from the acousto-optic modulator; and generating, by operation of the first comb generator, the first frequency comb signal based on the first portion of the first laser signal.

Implementations of the second example may include one or more of the following features. The output optical signals are based on interactions of the vapor with the input optical signals in the presence of electromagnetic radiation from outside the vapor cell sensor, and the method includes by operation of a signal processing system communicably coupled to the optical detector, generating data representing properties of the output optical signals at one or more comb frequencies of the first frequency comb signal; and determining one or more properties of the electromagnetic radiation based on the data. The electromagnetic radiation is from a wireless communication node of a wireless communication network, and the method includes, by operation of the signal processing system, characterizing the radio frequency signals from the wireless communication node.

Implementations of the second example may include one or more of the following features. The method includes receiving, at one or more frequency shifters, selected frequency components; shifting, by operation of the frequency shifters, the selected frequency components toward a first set of Rydberg states of the vapor; receiving, at the vapor cell sensor, the input optical signals based on the detuned frequency components and the first frequency comb signal; producing, by operation of the vapor cell sensor, output optical signals based on the input optical signals; and processing, by operation of the signal processing system, the output optical signals to identify signals in the electromagnetic radiation that are off resonance with a transition frequency between the first set of Rydberg states and a second set of Rydberg states. Processing the output optical signals to identify signals in the electromagnetic radiation that are off resonance with a transition frequency includes digitizing the detected output optical signal from the optical detector; performing a transformation of the digitized output optical signal; and identifying off-resonance peaks in the transformed output optical signal as a function of a frequency detuning of the selected first frequency components.

In a third example, a system includes a laser system, a vapor cell sensor, an optical detector, and a signal processing system. The laser system includes a first laser configured to generate a first laser signal; a comb generator configured to output a frequency comb signal based on the first laser signal; a second laser configured to generate a second laser signal. The vapor cell sensor includes a vapor and is configured to receive input optical signals based on the frequency comb signal and the second laser signal; and produce output optical signals based on interactions of the vapor with the input optical signals and electromagnetic radiation. The optical detector is configured to detect the output optical signals. The signal processing system is communicably coupled to the optical detector and is configured to process the output optical signals, wherein processing the output optical signals includes identifying signals in the electromagnetic radiation that are off resonance with a transition frequency between Rydberg states of the vapor.

Implementations of the third example may include one or more of the following features. The comb generator is a first comb generator, the frequency comb signal is a first frequency comb signal, and the system includes a second comb generator configured to generate a second frequency comb signal based on the second laser signal; a frequency separator communicably coupled to the second comb generator and configured to select one or more frequency components of the second frequency comb signal; and one or more frequency shifters configured to receive the selected frequency components from the frequency separator; and shift the selected frequency components toward a chosen Rydberg state of the vapor. The input optical signals are based on the shifted frequency component of the second frequency comb signal and the first frequency comb signal.

Implementations of the third example may include one or more of the following features. The system includes an amplifier which is configured to receive the one or more selected frequency components from the frequency separator; and amplify the one or more selected frequency components of the second frequency comb signal. Each of the one or more frequency shifters includes an optical modulator that performs single sideband suppressed carrier (SSB-SC) modulation. The frequency separator includes a frequency disperser configured to spatially separate frequency components of the second frequency comb signal; and a frequency selector configured to select the one or more frequency components from the spatially separated frequency components. The frequency selector includes drop-out filters defined by a photonic integrated circuit. The frequency selector includes optical switches defined by a photonic integrated circuit. The system includes a plurality of vapor cell sensors each configured to receive input optical signals based on the first frequency comb signal and the second frequency comb signal; and produce output optical signals based on the input optical signals. The optical switches are configured to route distinct frequency components of the second frequency comb signal to distinct vapor cell sensors of the plurality of vapor cell sensors.

Implementations of the third example may include one or more of the following features. The first comb generator includes a first electro-optic modulator, and the second comb generator includes a second electro-optic modulator. The laser system includes an acousto-optic modulator configured to receive the first laser signal from the first laser; and split the first laser signal into first and second portions, the second portion having a frequency different from that of the first portion. The comb generator is configured to receive the first portion of the first laser signal from the acousto-optic modulator; and generate the frequency comb signal based on the first portion of the first laser signal.

Implementations of the third example may include one or more of the following features. The signal processing system is configured to transform the output optical signals from the time domain to the frequency domain; and generate an electromagnetically induced transparency or electromagnetically induced absorption (EIT/EIA) spectrum or an EIT spectrum based on the transformed output optical signals. Transforming the output optical signals from the time domain to the frequency domain includes digitizing the detected output optical signals from the optical detector; and performing a transformation of the digitized output optical signals. Identifying the signals in the electromagnetic radiation that are off resonance with a transition frequency between Rydberg states includes determining amplitude and frequency of one or more off-resonance peaks based on a change in the generated EIT/EIA spectrum. the Rydberg state is a first Rydberg state, the frequency component of the second frequency comb signal is a first frequency component of the second frequency comb signal, The frequency separator is configured to select a second frequency component of the second frequency comb signal according to a second, distinct Rydberg state, and the one or more frequency shifters are configured to receive the second selected frequency component from the frequency separator; and shift the second selected frequency component toward the second Rydberg state of the vapor. The input optical signals are based on the second shifted frequency component of the second frequency comb signal and the first frequency comb signal.

In a fourth example, a method includes generating, by operation of a comb generator, a frequency comb signal based on a first laser signal received from a first laser; receiving, at a vapor cell sensor comprising a vapor, input optical signals based on the frequency comb signal and a second laser signal from a second laser; detecting, by operation of an optical detector, output optical signals from the vapor cell sensor, the output optical signals generated based on interactions of the vapor with the input optical signals and electromagnetic radiation; and processing, by operation of a signal processing system, the output optical signals to identify signals in the electromagnetic radiation that are off resonance with a transition frequency between Rydberg states of the vapor.

Implementations of the fourth example may include one or more of the following features. The comb generator is a first comb generator, the frequency comb signal is a first frequency comb signal, and the method includes generating, by operation of a second comb generator, a second frequency comb signal based on the second laser signal received from the second laser; selecting, by operation of a frequency separator, a frequency component from the second frequency comb signal; and receiving, at one or more frequency shifters, the selected frequency component from the frequency separator; and shifting the selected frequency component toward a Rydberg state of the vapor. The input optical signals are based on the shifted frequency component of the second frequency comb signal and the first frequency comb signal.

Implementations of the fourth example may include one or more of the following features. The method includes receiving, at one or more amplifiers, the one or more selected frequency components from the frequency separator; and amplifying, by operation of the one or more amplifiers, the one or more selected frequency components of the second frequency comb signal. Each of the one or more frequency shifters includes an optical modulator that performs single sideband suppressed carrier (SSB-SC) modulation. The frequency separator includes a frequency disperser and a frequency selector, and selecting the one or more frequency components from the second frequency comb signal includes spatially separating, by operation of the frequency disperser, frequency components of the second frequency comb signal; and selecting, by operation of the frequency selector, the one or more frequency components from the spatially separated frequency components.

Implementations of the fourth example may include one or more of the following features. The method includes transforming, by operation of the signal processing system, the output optical signals in a time domain to a frequency domain; and generating an electromagnetically induced transparency or electromagnetically induced absorption (EIT/EIA) spectrum or an EIT spectrum based on the transformed output optical signals. Identifying the signals in the electromagnetic radiation that are off resonance with a transition frequency between Rydberg states includes determining amplitudes and frequencies of one or more off-resonance peaks based on a change in the generated EIT/EIA spectrum.

Implementations of the fourth example may include one or more of the following features. Identifying the signals in the electromagnetic radiation that are off resonance with a transition frequency between Rydberg states includes determining amplitudes and frequencies of one or more off-resonance peaks based on one or more frequency components of the frequency comb signal. The Rydberg state is a first Rydberg state, the frequency component of the second frequency comb signal is a first frequency component of the second frequency comb signal, the frequency separator is configured to select a second frequency component of the second frequency comb signal according to a second, distinct Rydberg state, the one or more frequency shifters is configured to receive the second selected frequency component from the frequency separator; and shift the second selected frequency component toward the second Rydberg state of the vapor. The input optical signals are based on the second shifted frequency component of the second frequency comb signal and the first frequency comb signal.

Implementations of the fourth example may include one or more of the following features. The method includes routing distinct frequency components of the second frequency comb signal to distinct vapor cell sensors of a plurality of vapor cell sensors. Generating the frequency comb signal based on the first laser signal includes receiving, at an acousto-optic modulator, the first laser signal from the first laser; splitting, by operation of the acousto-optic modulator, the first laser signal into first and second portions, the second portion having a frequency different from that of the first portion; receiving, at the comb generator, the first portion of the first laser signal from the acousto-optic modulator; and generating, by operation of the comb generator, the frequency comb signal based on the first portion of the first laser signal. Identifying the signals in the electromagnetic radiation that are off resonance with a transition frequency between Rydberg states includes determining amplitudes and frequencies of one or more off-resonance peaks based on one or more frequency components of the frequency comb signal. Identifying the signals in the electromagnetic radiation that are off resonance with a transition frequency between Rydberg states includes digitizing the detected output optical signal from the optical detector; performing a transformation of the digitized output optical signal; and identifying off-resonance peaks in the transformed output optical signal as a function of a frequency detuning of the selected first frequency components.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A system comprising:
   a laser system comprising:
     a first laser configured to generate a first laser signal;
     a comb generator configured to output a frequency comb signal based on the first laser signal;
     a second laser configured to generate a second laser signal;
   a vapor cell sensor comprising a vapor and configured to:
     receive input optical signals based on the frequency comb signal and the second laser signal; and
     produce output optical signals based on interactions of the vapor with the input optical signals and electromagnetic radiation;
   an optical detector configured to detect the output optical signals; and
   a signal processing system communicably coupled to the optical detector and configured to process the output optical signals, wherein processing the output optical signals comprises identifying signals in the electromagnetic radiation that are off resonance with a transition frequency between Rydberg states of the vapor.

2. The system of claim 1, wherein the comb generator is a first comb generator, the frequency comb signal is a first frequency comb signal, and the system comprises:
   a second comb generator configured to generate a second frequency comb signal based on the second laser signal;

a frequency separator communicably coupled to the second comb generator and configured to select one or more frequency components of the second frequency comb signal; and
one or more frequency shifters configured to:
receive the selected frequency components from the frequency separator; and
shift the selected frequency components toward a chosen Rydberg state of the vapor,
wherein the input optical signals are based on the shifted frequency component of the second frequency comb signal and the first frequency comb signal.

3. The system of claim 2, comprising an amplifier configured to:
receive the one or more selected frequency components from the frequency separator; and
amplify the one or more selected frequency components of the second frequency comb signal.

4. The system of claim 2, comprising an amplifier configured to:
receive the one or more shifted frequency components from the one or more frequency shifters; and
amplify the one or more shifted frequency components of the second frequency comb signal.

5. The system of claim 2, comprising an amplifier configured to:
receive the one or more frequency components from the second comb generator; and
amplify the one or more frequency components of the second frequency comb signal.

6. The system of claim 2, wherein each of the one or more frequency shifters comprises an optical modulator that performs single sideband suppressed carrier (SSB-SC) modulation.

7. The system of claim 2, wherein the frequency separator comprises:
a frequency disperser configured to spatially separate frequency components of the second frequency comb signal; and
a frequency selector configured to select the one or more frequency components from the spatially separated frequency components.

8. The system of claim 7, wherein the frequency selector comprises drop-out filters defined by a photonic integrated circuit.

9. The system of claim 7, wherein the frequency selector comprises optical switches defined by a photonic integrated circuit.

10. The system of claim 9, comprising a plurality of vapor cell sensors each configured to:
receive input optical signals based on the first frequency comb signal and the second frequency comb signal; and
produce output optical signals based on the input optical signals,
wherein the optical switches are configured to route distinct frequency components of the second frequency comb signal to distinct vapor cell sensors of the plurality of vapor cell sensors via the one or more frequency shifters.

11. The system of claim 2, wherein the first comb generator comprises a first electro-optic modulator and the second comb generator comprises a second electro-optic modulator.

12. The system of claim 1, wherein the laser system comprises:
an acousto-optic modulator configured to:
receive the first laser signal from the first laser; and
split the first laser signal into first and second portions, the second portion having a frequency different from that of the first portion; and
the comb generator is configured to:
receive the first portion of the first laser signal from the acousto-optic modulator; and
generate the frequency comb signal based on the first portion of the first laser signal.

13. The system of claim 1, wherein the signal processing system is configured to:
transform the output optical signals from the time domain to the frequency domain; and
generate an electromagnetically induced transparency or electromagnetically induced absorption (EIT/EIA) spectrum based on the transformed output optical signals.

14. The system of claim 13, wherein transforming the output optical signals from the time domain to the frequency domain comprises:
digitizing the detected output optical signals from the optical detector; and
performing a transformation of the digitized output optical signals.

15. The system of claim 13, wherein identifying the signals in the electromagnetic radiation that are off resonance with a transition frequency between Rydberg states comprises determining at least one of amplitude, frequency, phase, or phase change of one or more off-resonance peaks based on a change in the generated EIT/EIA spectrum.

16. The system of claim 1, wherein the Rydberg state is a first Rydberg state, the frequency component of the second frequency comb signal is a first frequency component of the second frequency comb signal, the frequency separator is configured to select a second frequency component of the second frequency comb signal according to a second, distinct Rydberg state, and the one or more frequency shifters are configured to:
receive the second selected frequency component from the frequency separator; and
shift the second selected frequency component toward the second Rydberg state of the vapor,
wherein the input optical signals are based on the second shifted frequency component of the second frequency comb signal and the first frequency comb signal.

17. A method comprising:
generating, by operation of a comb generator, a frequency comb signal based on a first laser signal received from a first laser;
receiving, at a vapor cell sensor comprising a vapor, input optical signals based on the frequency comb signal and a second laser signal from a second laser;
detecting, by operation of an optical detector, output optical signals from the vapor cell sensor, the output optical signals generated based on interactions of the vapor with the input optical signals and electromagnetic radiation; and
processing, by operation of a signal processing system, the output optical signals to identify signals in the electromagnetic radiation that are off resonance with a transition frequency between Rydberg states of the vapor.

18. The method of claim 17, wherein the comb generator is a first comb generator, the frequency comb signal is a first frequency comb signal, and the method comprises:
generating, by operation of a second comb generator, a second frequency comb signal based on the second laser signal received from the second laser;

selecting, by operation of a frequency separator, a frequency component from the second frequency comb signal;

receiving, at one or more frequency shifters, the selected frequency component from the frequency separator; and shifting the selected frequency component toward a Rydberg state of the vapor, wherein the input optical signals are based on the shifted frequency component of the second frequency comb signal and the first frequency comb signal.

19. The method of claim 18, comprising:
receiving, at an amplifier, the selected frequency component from the frequency separator; and
amplifying, by operation of the amplifier, the selected frequency component of the second frequency comb signal.

20. The method of claim 18, comprising:
receiving, at an amplifier, the shifted frequency component from the one or more frequency shifters; and
amplifying, by operation of the amplifier, the shifted frequency component of the second frequency comb signal.

21. The method of claim 18, comprising:
prior to selecting, receiving, at an amplifier, the frequency components from the second comb generator; and
amplifying, by operation of the amplifier, the one or more frequency components of the second frequency comb signal.

22. The method of claim 18, wherein each of the one or more frequency shifters comprises an optical modulator that performs single sideband suppressed carrier (SSB-SC) modulation.

23. The method of claim 18, wherein the frequency separator comprises a frequency disperser and a frequency selector, and selecting the one or more frequency components from the second frequency comb signal comprises:
spatially separating, by operation of the frequency disperser, frequency components of the second frequency comb signal; and
selecting, by operation of the frequency selector, the one or more frequency components from the spatially separated frequency components.

24. The method of claim 18, wherein the Rydberg state is a first Rydberg state, the frequency component of the second frequency comb signal is a first frequency component of the second frequency comb signal, the frequency separator is configured to select a second frequency component of the second frequency comb signal according to a second, distinct Rydberg state, the one or more frequency shifters is configured to:
receive the second selected frequency component from the frequency separator; and
shift the second selected frequency component toward the second Rydberg state of the vapor, wherein the input optical signals are based on the second shifted frequency component of the second frequency comb signal and the first frequency comb signal.

25. The method of claim 17, comprising:
after shifting, routing distinct shifted frequency components of the second frequency comb signal to distinct vapor cell sensors of a plurality of vapor cell sensors.

26. The method of claim 17, wherein generating the frequency comb signal based on the first laser signal comprises:
receiving, at an acousto-optic modulator, the first laser signal from the first laser;
splitting, by operation of the acousto-optic modulator, the first laser signal into first and second portions, the second portion having a frequency different from that of the first portion;
receiving, at the comb generator, the first portion of the first laser signal from the acousto-optic modulator; and
generating, by operation of the comb generator, the frequency comb signal based on the first portion of the first laser signal.

27. The method of claim 17, comprising:
transforming, by operation of the signal processing system, the output optical signals in a time domain to a frequency domain; and
generating an electromagnetically induced transparency or electromagnetically induced absorption (EIT/EIA) spectrum based on the transformed output optical signals.

28. The method of claim 27, wherein identifying the signals in the electromagnetic radiation that are off resonance with a transition frequency between Rydberg states comprises determining at least one of amplitudes, frequencies, phases, or phase changes of one or more off-resonance peaks based on a change in the generated EIT/EIA spectrum.

29. The method of claim 17, wherein identifying the signals in the electromagnetic radiation that are off resonance with a transition frequency between Rydberg states comprises determining at least one of amplitudes, frequencies, phases, or phase changes, of one or more off-resonance peaks based on one or more frequency components of the frequency comb signal.

30. The method of claim 17, wherein identifying the signals in the electromagnetic radiation that are off resonance with a transition frequency between Rydberg states comprises:
digitizing the detected output optical signal from the optical detector;
performing a transformation of the digitized output optical signal; and
identifying off-resonance peaks in the transformed output optical signal as a function of a frequency detuning of the selected first frequency components.

* * * * *